(12) United States Patent
Pethick

(10) Patent No.: US 11,975,498 B2
(45) Date of Patent: May 7, 2024

(54) COMPOSITE CONNECTORS AND METHODS OF MANUFACTURING THE SAME

(71) Applicant: Crompton Technology Group Limited, Solihull (GB)

(72) Inventor: Jon Pethick, Leicestershire (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 938 days.

(21) Appl. No.: 16/536,361

(22) Filed: Aug. 9, 2019

(65) Prior Publication Data
US 2020/0049181 A1    Feb. 13, 2020

(30) Foreign Application Priority Data

Aug. 10, 2018 (EP) .................................... 18275117

(51) Int. Cl.
| | | |
|---|---|---|
| *B29C 70/48* | (2006.01) | |
| *B29C 53/56* | (2006.01) | |

(Continued)

(52) U.S. Cl.
CPC ............ *B29C 70/48* (2013.01); *B29C 53/566* (2013.01); *B29C 53/8008* (2013.01);
(Continued)

(58) Field of Classification Search
CPC ..... B29C 70/48; B29C 70/302; B29C 53/566; B29C 53/8008; B29C 57/00; F16B 9/052; F16B 9/02; C08J 5/046
(Continued)

(56) References Cited

U.S. PATENT DOCUMENTS

| | | |
|---|---|---|
| 746,648 A | 12/1903 | Tippett |
| 3,156,489 A | 11/1964 | Deringer |

(Continued)

FOREIGN PATENT DOCUMENTS

| | | |
|---|---|---|
| CN | 2502105 Y | 7/2002 |
| CN | 102278342 A | 12/2011 |

(Continued)

OTHER PUBLICATIONS

Abstract for DE102013005649 (A1), Published: Oct. 2, 2014, 1 page.

(Continued)

*Primary Examiner* — S. Behrooz Ghorishi
*Assistant Examiner* — Gregory C. Grosso
(74) *Attorney, Agent, or Firm* — CANTOR COLBURN LLP

(57) ABSTRACT

A method of manufacturing a composite (e.g. fibre-reinforced polymer) connector for a fluid transfer conduit includes: manufacturing a continuous fibre pre-form net 150 that is shaped to comprise a hub-forming portion 156 and a flange-forming portion 158, the continuous fibre pre-form net comprising continuous fibre reinforcement 110 and a common support layer 151 to which the continuous fibre reinforcement 110 is secured by being stitched thereto; placing the continuous fibre pre-form net 150 into a mould, the mould being shaped such that the hub-forming portion 156 forms a tubular hub portion which extends along a central axis and the flange-forming portion 158 forms a flange portion which extends from the hub portion at an angle to the central axis; and introducing polymer into the mould so as to form a composite connector comprising the flange portion and the hub portion.

10 Claims, 11 Drawing Sheets

(51) Int. Cl.
*B29C 53/80* (2006.01)
*B29C 57/00* (2006.01)
*B29C 70/30* (2006.01)
*C08J 5/04* (2006.01)
*F16B 9/00* (2006.01)
*F16B 9/02* (2006.01)

(52) U.S. Cl.
CPC ............ *B29C 57/00* (2013.01); *B29C 70/302* (2021.05); *C08J 5/046* (2013.01); *F16B 9/02* (2013.01); *F16B 9/052* (2018.08)

(58) Field of Classification Search
USPC ...................................................... 285/222.1
See application file for complete search history.

(56) References Cited

U.S. PATENT DOCUMENTS

| | | | |
|---|---|---|---|
| 3,224,795 A | 12/1965 | Conley | |
| 3,537,484 A | 11/1970 | McLarty | |
| 3,651,661 A | 3/1972 | Darrow | |
| 3,899,006 A | 8/1975 | Champleboux et al. | |
| 3,920,049 A | 11/1975 | Axel et al. | |
| 4,217,935 A | 8/1980 | Grendelman et al. | |
| 4,225,158 A | 9/1980 | Puechavy | |
| 4,256,790 A | 3/1981 | Lackman et al. | |
| 4,330,016 A | 5/1982 | Grendelman | |
| 4,511,423 A | 4/1985 | Magarian et al. | |
| 4,622,091 A | 11/1986 | Letterman | |
| 4,702,498 A | 10/1987 | Mueller et al. | |
| 4,813,457 A | 3/1989 | Offringa et al. | |
| 4,846,908 A | 7/1989 | Aldrich et al. | |
| 4,980,006 A | 12/1990 | Bordner | |
| 5,106,130 A * | 4/1992 | Ellsworth | F16L 15/001 285/423 |
| 5,110,644 A | 5/1992 | Sparks et al. | |
| 5,135,596 A | 8/1992 | Pabsch et al. | |
| 5,397,272 A | 3/1995 | Smiley et al. | |
| 5,685,933 A * | 11/1997 | Ohta | B29C 70/085 156/169 |
| 6,251,332 B1 | 6/2001 | Nakagawa et al. | |
| 6,361,080 B1 | 3/2002 | Walsh et al. | |
| 7,138,167 B2 | 11/2006 | Sakonjo et al. | |
| 8,424,921 B2 | 4/2013 | Marlin et al. | |
| 8,491,740 B2 | 7/2013 | Serey et al. | |
| 8,800,605 B2 | 8/2014 | Barlow et al. | |
| 8,813,335 B2 | 8/2014 | Geislinger et al. | |
| 8,899,274 B1 | 12/2014 | Grosch | |
| 9,140,140 B2 * | 9/2015 | McMillan | F01D 25/243 |
| 9,222,605 B2 | 12/2015 | Ciolczyk et al. | |
| 9,482,266 B2 | 11/2016 | Dewhirst | |
| 9,731,453 B2 | 8/2017 | Humfeld et al. | |
| 9,897,122 B2 | 2/2018 | Luce | |
| 9,937,671 B2 | 4/2018 | Larson | |
| 10,539,174 B2 | 1/2020 | Gurvich et al. | |
| 2003/0193194 A1 | 10/2003 | Sadr | |
| 2009/0200700 A1 | 8/2009 | Marlin et al. | |
| 2009/0243284 A1 | 10/2009 | Klingel, Jr. et al. | |
| 2010/0122749 A1 | 5/2010 | Bouleti et al. | |
| 2011/0192528 A1 | 8/2011 | Kozaki et al. | |
| 2012/0057267 A1 | 3/2012 | Petit et al. | |
| 2013/0236664 A1 | 9/2013 | Tsotsis | |
| 2013/0266431 A1 | 10/2013 | Moram et al. | |
| 2014/0138947 A1 | 5/2014 | Palsson et al. | |
| 2014/0309042 A1 * | 10/2014 | Chase | F16D 3/78 464/92 |
| 2015/0176732 A1 | 6/2015 | Courpet et al. | |
| 2015/0299913 A1 | 10/2015 | Hori et al. | |
| 2015/0343716 A1 | 12/2015 | Feeney et al. | |
| 2016/0273696 A1 | 9/2016 | Hutchinson | |
| 2016/0356403 A1 | 12/2016 | Perrigo et al. | |
| 2017/0191618 A1 | 7/2017 | Kloft et al. | |
| 2017/0198734 A1 | 7/2017 | Bernard et al. | |
| 2017/0227058 A1 | 8/2017 | Pollitt | |

| | | | |
|---|---|---|---|
| 2020/0049180 A1 | 2/2020 | Pollitt | |
| 2020/0049182 A1 | 2/2020 | Bernard et al. | |
| 2020/0049282 A1 | 2/2020 | Giannakopoulos et al. | |
| 2020/0049283 A1 | 2/2020 | Chase et al. | |
| 2020/0049284 A1 | 2/2020 | Pollitt et al. | |
| 2020/0049296 A1 | 2/2020 | Giannakopoulos et al. | |
| 2020/0316830 A1 | 10/2020 | Bernard et al. | |
| 2021/0069937 A1 * | 3/2021 | Peterson | B32B 27/08 |
| 2023/0160505 A1 | 5/2023 | Pollitt et al. | |

FOREIGN PATENT DOCUMENTS

| | | |
|---|---|---|
| CN | 106015302 A | 10/2016 |
| CN | 206840761 U | 1/2018 |
| CN | 108268692 A | 7/2018 |
| DE | 19834772 A1 | 2/2000 |
| DE | 19906618 A1 | 8/2000 |
| DE | 102008033577 A1 | 1/2010 |
| DE | 102011077287 A1 | 12/2012 |
| DE | 102013005649 A1 | 10/2014 |
| DE | 102014004157 A1 | 9/2015 |
| EP | 1324092 A1 | 7/2003 |
| EP | 1859958 B1 | 9/2010 |
| EP | 3332946 A1 | 6/2018 |
| FR | 2706574 A1 | 12/1994 |
| GB | 1222041 A | 2/1971 |
| GB | 2033992 A | 5/1980 |
| GB | 2082730 A | 3/1982 |
| JP | 2875865 B2 | 3/1999 |
| JP | 03276221 B2 | 4/2002 |
| JP | 2013044358 A | 3/2013 |
| WO | 2010092979 A1 | 8/2010 |
| WO | 2011039828 A1 | 4/2011 |
| WO | 2011039929 A1 | 4/2011 |
| WO | 2013041948 A1 | 3/2013 |
| WO | 2017123399 A1 | 7/2017 |

OTHER PUBLICATIONS

Abstract for DE19834772 (A1), Published: Feb. 10, 2000, 1 page.
EPO Official Letter for Application No. 18275118.0, mailed Jun. 29, 2022, 4 pages.
EPO Official Letter for Application No. 18386023.8, mailed Jun. 28, 2022, 3 pages.
EPO Official Letter for Application No. 18386024.6, mailed Jun. 29, 2022, 4 pages.
EPO Official Letter for Application No. 18386025.3, mailed Jun. 29, 2022, 3 pages.
Extended European Search Report for International Application No. 18275115.6 dated Jan. 23, 2019, 9 pages.
Extended European Search Report for International Application No. 18275116.4 dated Feb. 28, 2019, 24 pages.
Extended European Search Report for International Application No. 18275117.2 dated Feb. 27, 2019, 13 pages.
Extended European Search Report for International Application No. 18275118.0 dated Feb. 26, 2019, 7 pages.
Extended European Search Report for International Application No. 18386023.8 dated Feb. 27, 2019, 7 pages.
Extended European Search Report for International Application No. 18386024.6 dated Feb. 27, 2019, 7 pages.
Extended European Search Report for International Application No. 18386025.3 dated Feb. 28, 2019, 13 pages.
Abstract for CN106015302 (A), Published Oct. 12, 2016, 1 page.
Abstract of CN102278342, Published Dec. 14, 2011, 1 page.
Abstract of CN108268692, published Jul. 10, 2018, 1 page.
First CN Office Action for Application No. 201910725776.2, dated Dec. 28, 2021, 7 pages.
Machine Transmittal of First CN Office Action for Application No. 201910725776.2, dated Dec. 28, 2021, 6 pages.
Abstract of DE102011077287 (A1), Published: Dec. 13, 2012, 1 Page.
CN Office Action for Application No. 201910725776.2, dated May 29, 2023, 7 pages.
Machine Translation for CN2502105Y, Published: Jul. 24, 2002, 4 pages.

(56) References Cited

OTHER PUBLICATIONS

DE102008033577A1—Machine Translation—English (Year: 2008), 8 pages.
DE102014004157A1—Machine Translation—English (Year: 2014), 20 pages.

* cited by examiner

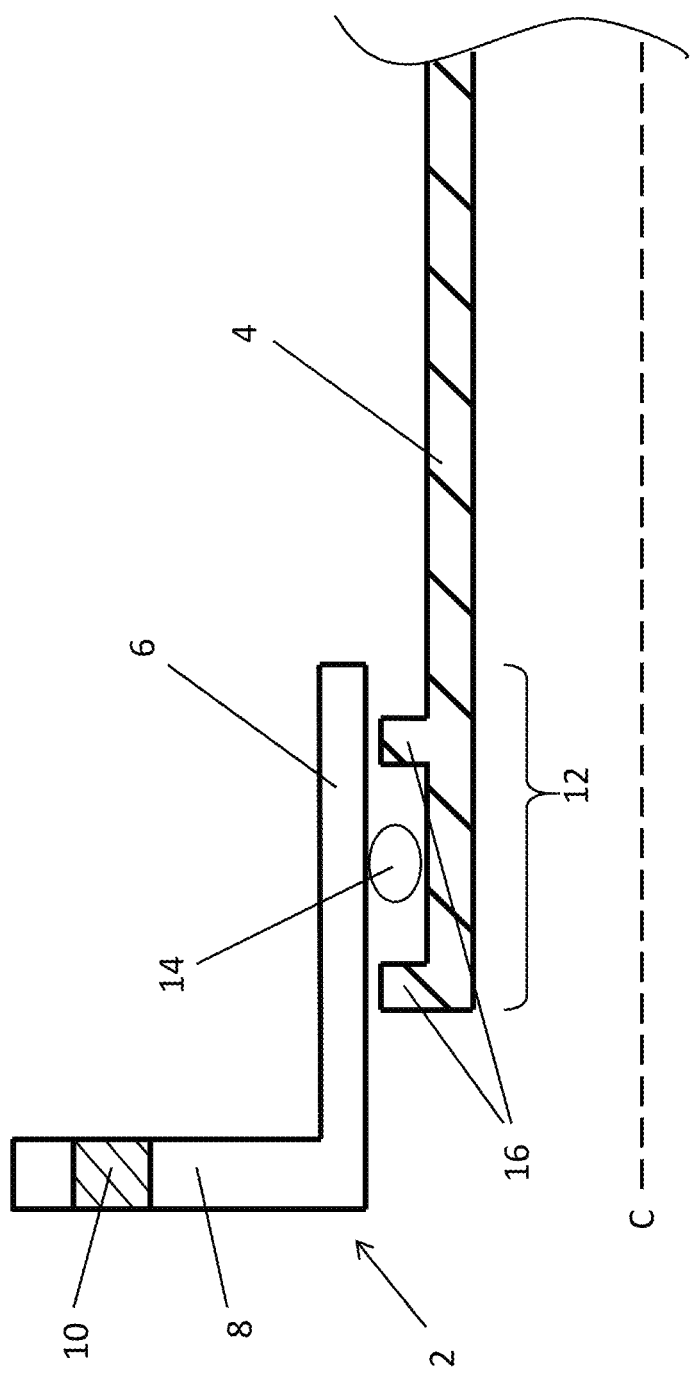

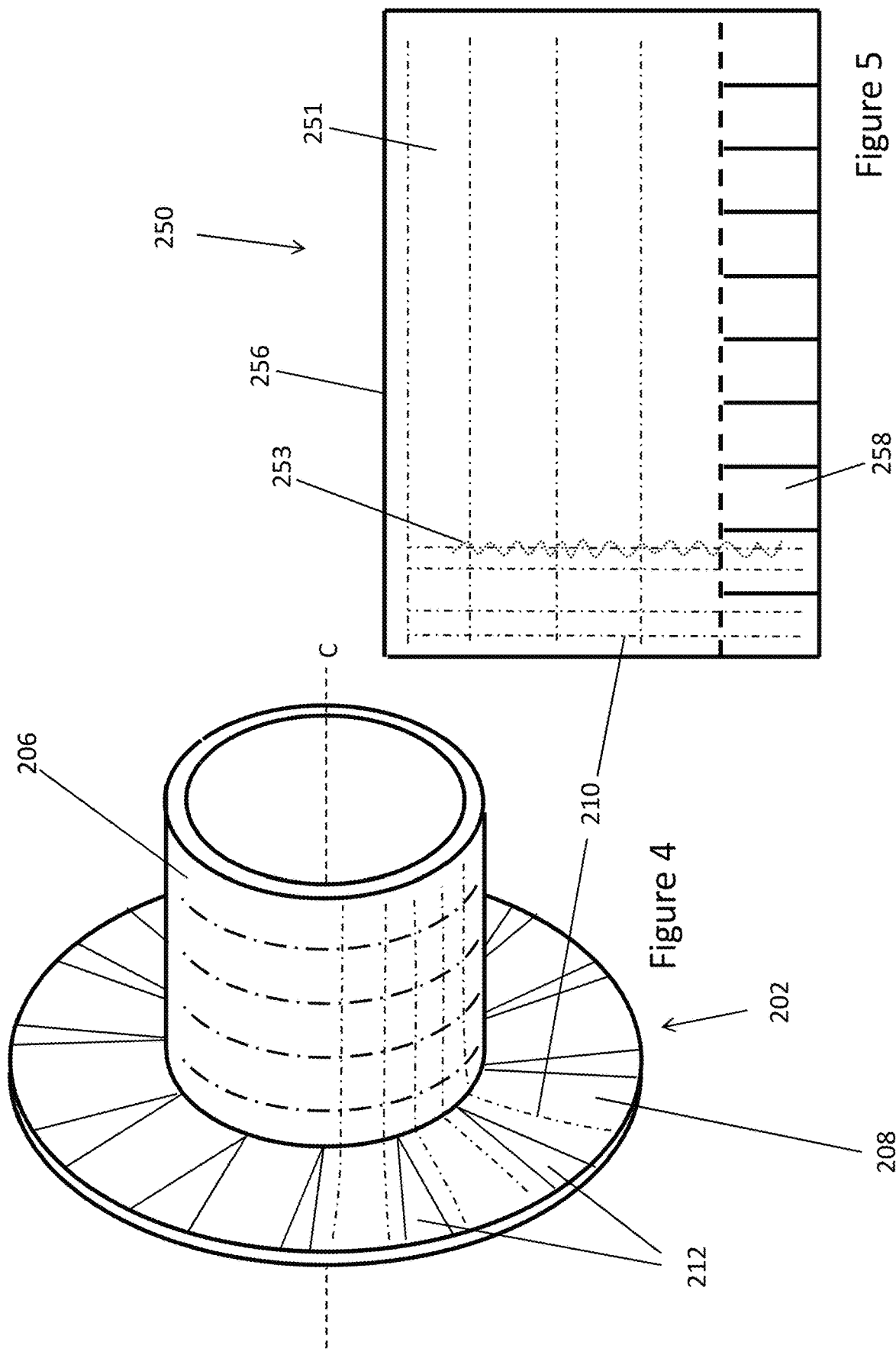

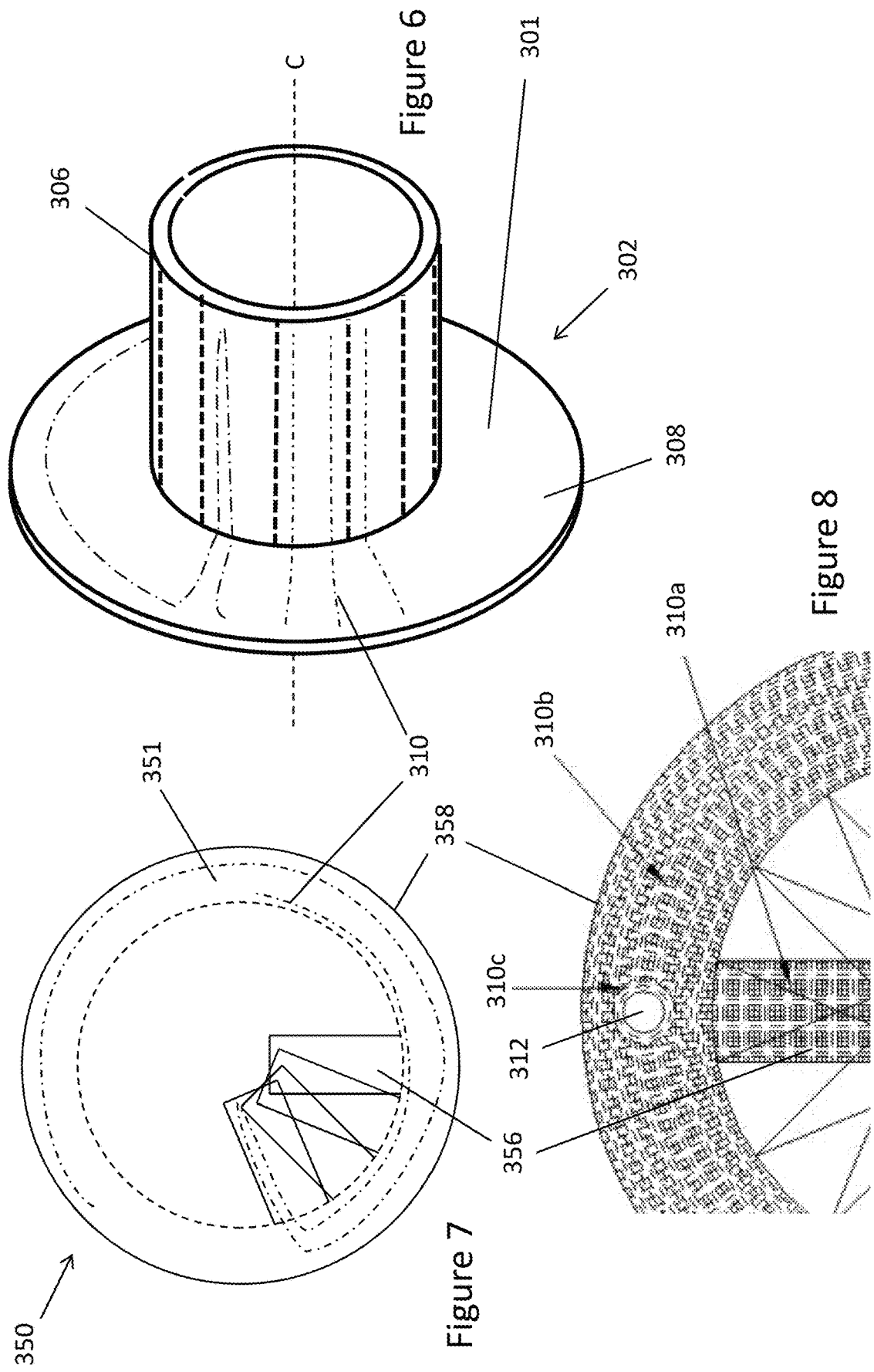

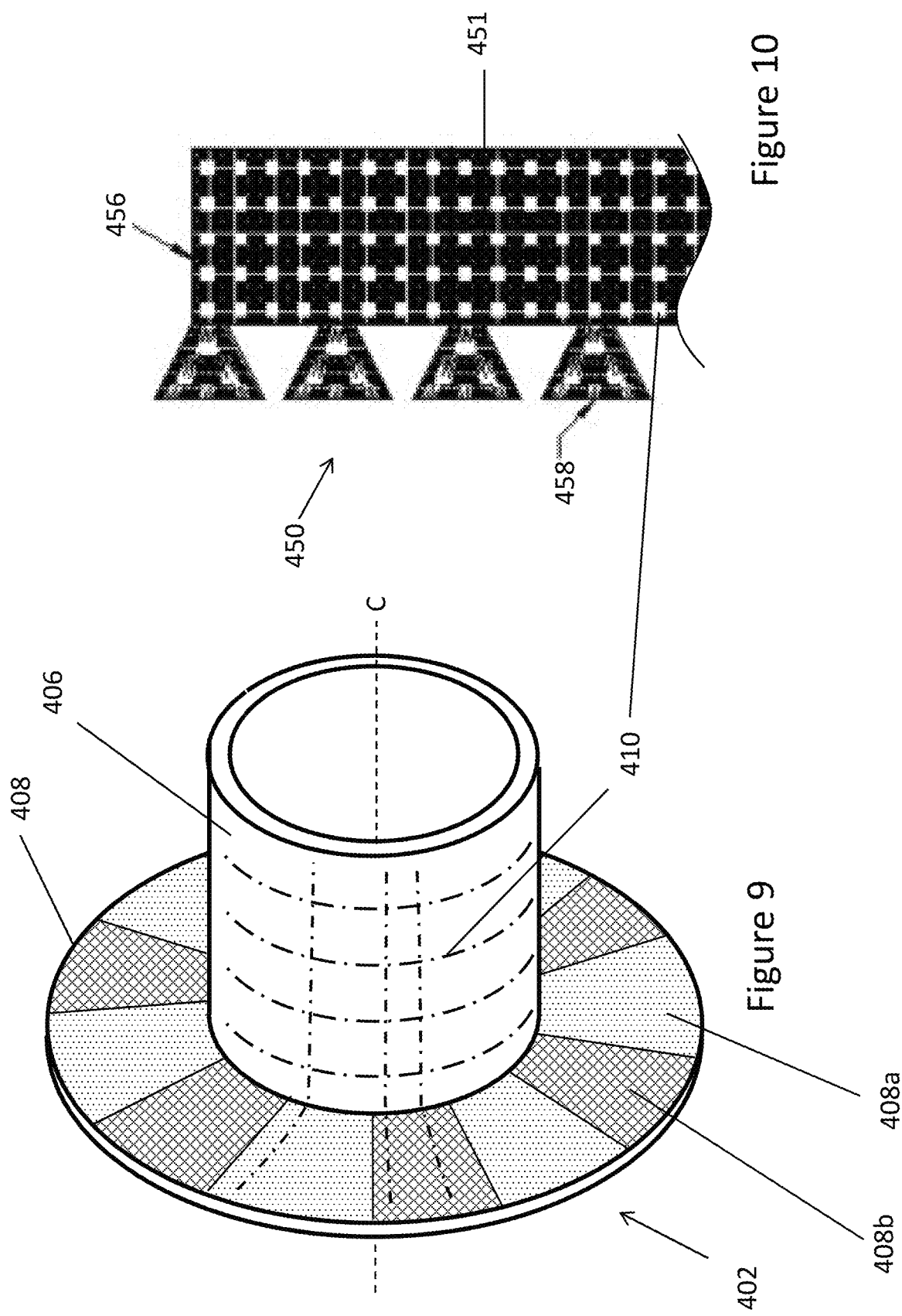

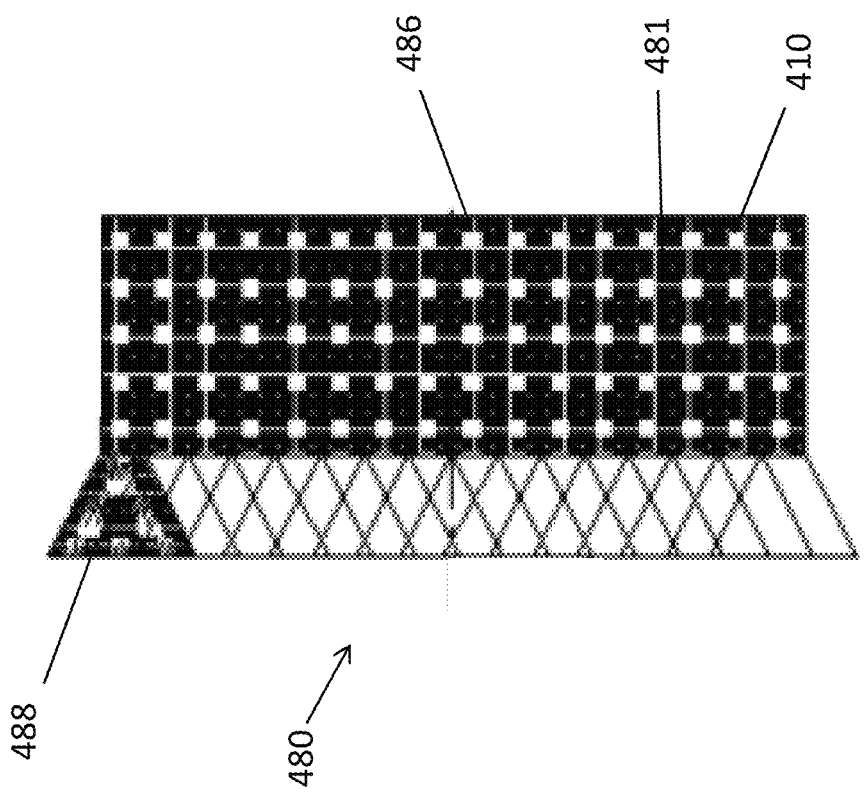
Figure 13
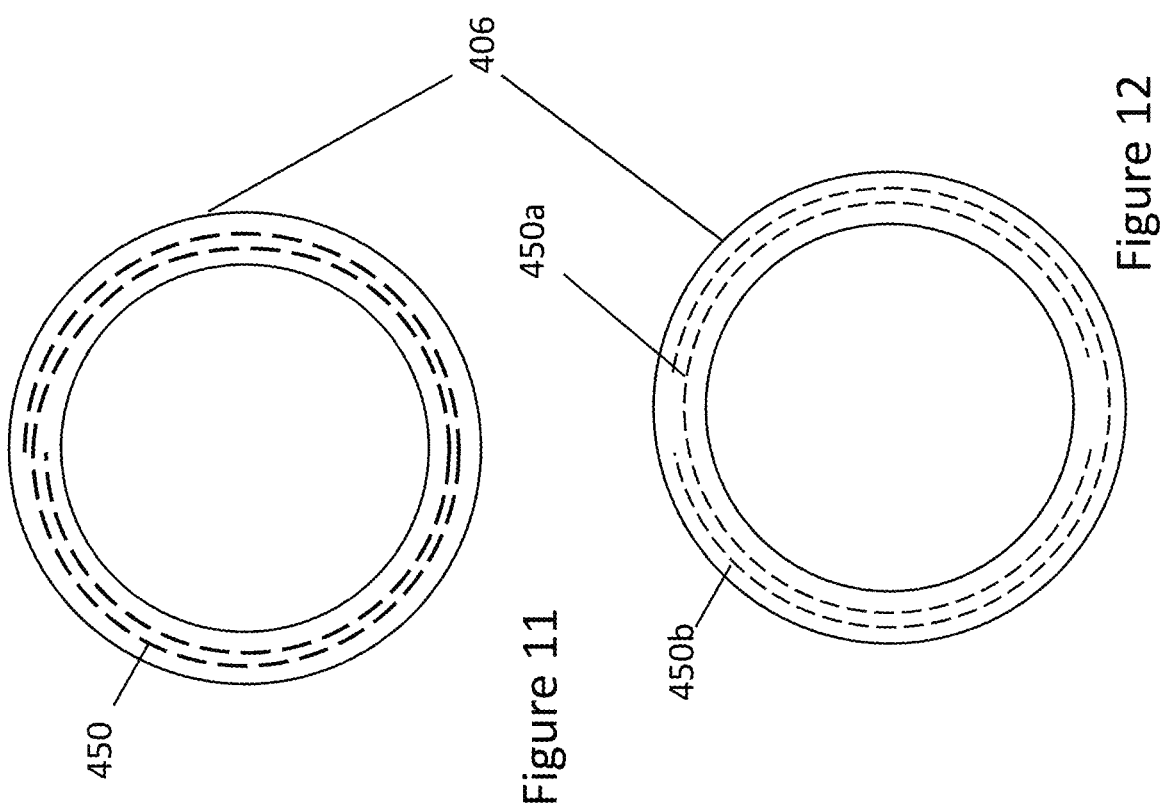
Figure 11
Figure 12

COMPOSITE CONNECTORS AND METHODS OF MANUFACTURING THE SAME

FOREIGN PRIORITY

This application claims priority to European Patent Application No. 18275117.2 filed Aug. 10, 2018, the entire contents of which is incorporated herein by reference.

TECHNICAL FIELD

The present disclosure relates to composite (e.g. fibre-reinforced polymer) connectors, e.g. for connecting fluid transfer conduits to other structures, and to methods of manufacturing composite (e.g. fibre-reinforced polymer) connectors for fluid transfer conduits.

BACKGROUND

Fluid transfer conduits (e.g. fuel pipes) are typically connected to other fixed structures (e.g. inside aeroplane wings) using one or more connectors. To allow for movement of the fixed structure without inducing large stresses on the fluid transfer conduit itself (e.g. as a wing flexes during flight), such connectors are designed to tolerate a small amount of relative movement between the fluid transfer conduit and the structure whilst still effectively supporting the conduit and sealing the connection. This is often achieved using an elastomeric O-ring, on which the fluid transfer conduit "floats", to seal the connection while allowing a small amount of relative motion.

In many applications, such connectors are required to withstand large circumferential loads (e.g. due to high internal pressures in a fluid transfer conduit) as well as other stresses. To provide the requisite strength while minimising part count, connectors are conventionally machined from a single block of metal (usually aluminium). However, this process results in a large amount of material being wasted (i.e. a very high so-called buy-to-fly ratio).

Furthermore, fluid transfer conduits are increasingly being constructed from composite materials (e.g. fibre-reinforced polymers), in order to save weight. However, when used with metallic connectors, composite fluid transfer conduits can experience various problems such as galvanic corrosion and a reduced temperature operating window due to unequal thermal expansion.

More recently, therefore, an alternative manufacturing technique has been developed whereby composite connectors are produced by injection moulding a thermoplastic matrix reinforced with randomly oriented chopped fibres (e.g. carbon/glass/aramid fibres). Because injection moulding is an additive process, it results in less wasted material during manufacture than conventional metal machining techniques. In addition, chopped-fibre reinforced composite parts are typically lighter than their metal equivalents. However, chopped-fibre reinforcement does not exploit fully the potential strength of reinforcing fibres.

SUMMARY

According to one aspect of the present disclosure, there is provided a composite (e.g. fibre-reinforced polymer) connector for a fluid transfer conduit comprising: a hub portion comprising a tube which extends substantially parallel to a central axis; and a flange portion which extends from the hub portion at an angle to the central axis; wherein the hub portion and the flange portion each comprise a polymer reinforced with continuous fibre reinforcement and a common support layer to which the continuous fibre reinforcement is secured by being stitched thereto; wherein at least some of the continuous fibre reinforcement extends between the hub portion and the flange portion.

Because of the high strength-to-weight ratio of continuous fibre-reinforced polymer, it will be appreciated by the person skilled in the art that the use of continuous fibre reinforcement in both the hub portion and the flange portion can produce a significantly stronger part using the same amount of material compared to randomly-oriented fibre reinforcement or entirely metal parts. Correspondingly, an equally strong part may be produced using less material, thus saving weight.

The composite connector according to the present disclosure may be produced using additive processes. This means that there is little material wasted during manufacture, especially compared to machining techniques used to construct conventional metal components. As a result, the cost of manufacturing a composite connector according to the present disclosure may be less than for an equivalent metal component, even if the underlying material costs are higher (due to less material going to waste).

When continuous fibre reinforcement is used to make a given component, the continuous fibre reinforcement may extend in one or more directions that are chosen to provide strength in a direction in which it is expected the flange or hub portion will experience load. The layup of the continuous fibre reinforcement can be tailored to the loads expected during service. Many fibres may be oriented in a primary direction of loading, and a lower proportion of fibres may therefore be oriented in directions in which the component experiences little load. This minimises the amount of material wasted when producing a part with a given load capacity. In addition, as compared to discontinuous e.g. chopped fibre reinforcement, this means that the layup of the continuous fibre reinforcement can provide the flange portion with non-isotropic properties.

Furthermore, when at least some of the continuous fibre reinforcement extends between the hub portion and the flange portion, the connector's resistance to bending loads is improved as compared to previous connectors (e.g. comprising chopped fibres). The orientation of the continuous fibre reinforcement that extends between the hub portion and the flange portion can be controlled to maximise the benefits of fibre reinforcement running continuously through the connector, and adapted for a range of different connector geometries. The use of stitching to secure the continuous fibre reinforcement to the common support layer assists with controlling the overall fibre layup.

When using randomly-oriented fibre reinforcement, no such tailoring can be performed, and as such the amount of material required to provide the required load resistance is increased. In addition, even when oriented in the direction of loading, chopped fibres inherently exhibit much lower tensile strength than the equivalent amount of continuous fibre reinforcement. US 2016/0273696 describes an example of a composite part injection-moulded from a thermoplastic matrix reinforced by chopped fibres.

As mentioned above, the composite connector of the present disclosure may be produced using less material than conventional metal connectors, reducing component weight. In many applications, such as in the aerospace industry, any weight saving is highly advantageous as it can lead to significant fuel (and thus cost) savings over the lifetime of a part.

As is mentioned above, the use of stitching to secure the continuous fibre reinforcement to the common support layer provides control over the fibre layup. The common support layer may be embedded in the same polymer, e.g. matrix material, as the continuous fibre reinforcement. However the support layer may not be expected to contribute significantly to the strength properties of the connector. In one or more examples, the support layer may take the form of a fibre veil, for example a veil of glass, carbon and/or aramid fibres. In one or more potentially overlapping examples, a polyester or nylon thread may be used to stitch the continuous fibre reinforcement to the common support layer.

In one or more examples, the continuous fibre reinforcement may comprise multiple layers stitched to the common support layer. The overall thickness of the composite connector may be dictated by the number of layers used and the thickness of those layers. For the same composite thickness, it is envisaged that a larger number of layers is likely to provide better product quality in any bends/radii of the connector (e.g. between the flange portion and the hub portion) than using fewer thicker layers.

Alternatively, or in addition to comprising multiple layers stitched to the common support layer, the composite connector may comprise a plurality of common support layers, to each of which one or more layers of continuous fibre reinforcement is stitched. The plurality of support layers may be arranged to reduce or eliminate the occurrence of non-reinforced (i.e. polymer-only) areas within the composite connector, e.g. by using different or complementary layers and/or by arranging layers with an angular offset. As is explained in more detail below, this may be particularly advantageous when the composite connector is formed using pre-form nets, as it may be difficult to form a three-dimensional connector with continuous fibre reinforcement that is contiguous throughout the connector (i.e. a connector with no unreinforced polymer-only regions) from a single two-dimensional pre-form net.

In some examples, the flange portion comprises continuous circumferentially-oriented fibre reinforcement. In such examples the continuous fibre reinforcement in the hub portion may comprise one or more separate segments of continuous fibre reinforcement. In such examples, continuous fibre reinforcement from the one or more separate segments extends into the flange portion. The plurality of separate segments may be separated by one or more regions of unreinforced polymer.

Additionally or alternatively, the hub portion may comprise continuous circumferentially-oriented fibre reinforcement, and optionally the flange portion may comprise a plurality of separate segments of continuous fibre reinforcement. The plurality of separate segments may be separated by one or more regions of unreinforced polymer.

The hub and flange portion may both comprise continuous circumferentially-oriented fibre reinforcement. In such examples, the continuous circumferentially-oriented fibre reinforcement in the hub or flange portions may be provided by an additional support layer to which the continuous circumferentially-oriented fibre reinforcement has been secured by being stitched thereto. The additional support layer may comprise a tubular hub portion overwrap and/or may comprise an annular flange portion overwrap.

For instance, in examples where the hub portion comprises continuous circumferentially-oriented fibre reinforcement and the flange portion comprises a plurality of separate segments of continuous fibre reinforcement separated by one or more regions of non-reinforced polymer, the flange portion may further comprise an annular flange overwrap arranged to cover the regions of non-reinforced polymer and provide continuous circumferentially-oriented fibre reinforcement in the flange portion.

Alternatively, in examples where the flange portion comprises continuous circumferentially-oriented fibre reinforcement and the hub portion comprises one or more separate segments of continuous fibre reinforcement separated by one or more regions of unreinforced polymer, the hub portion may further comprise an overwrap arranged to extend around the hub portion to cover the regions of unreinforced polymer and to provide continuous circumferentially-oriented fibre in the hub portion.

The flange portion may comprise a tapering portion at an end of the flange portion proximal to the hub portion, the tapering portion extending at a lesser angle to the central axis of the hub portion than a non-tapering portion of the flange portion. In other words, the flange portion may extend from the hub portion via this tapering portion.

The tapering portion may comprise continuous circumferentially-oriented fibre reinforcement. Additionally or alternatively, the tapering portion may comprise continuous axially-oriented and/or helically-oriented fibre reinforcement. The non-tapering portion may comprise one or more separate segments of continuous fibre reinforcement. The hub portion may comprise one or more separate segments of continuous fibre reinforcement. Thus, the composite connector may comprise a three-stage tapered connector.

The flange portion may comprise at least one fixing point (e.g. a through-hole) which may be used along with a suitable fastening means (e.g. a nut and bolt) to secure the connector to a structure. The fixing point may be formed by drilling through the composite connector in a post-production step, but this would result in constituent fibres of the continuous fibre reinforcement being severed, which can reduce the strength of the flange portion and thus the efficacy of the connector. In some examples, therefore, the fixing point is surrounded by unbroken fibre reinforcement. The fibres thus divert around the perimeter of a fixing point such as a through-hole. Stitching the continuous fibre reinforcement to the common support layer may assist with precise fibre placement around such fixing points.

In one or more examples, the flange portion comprises at least one fixing point and the continuous fibre reinforcement is arranged in a pattern around the fixing point, e.g. such that the continuous fibre reinforcement strengthens the fixing point. Conveniently, the continuous fibre reinforcement serves to assist in transmission of load between adjacent fixing points. In at least some examples, preferably the continuous fibre reinforcement at least partially encircles the fixing point(s). In some examples, the continuous fibre reinforcement may be arranged to encircle an adjacent pair of fixing points, e.g. at least 10 times. An opening may be formed at each fixing point to enable the attachment of a fastener to the flange portion at the fixing point. Where the continuous fibre reinforcement passes around a fixing point, it may result in the formation of a hub of increased thickness. This may strengthen the fixing point(s).

In some examples, the hub portion and the flange portion may each comprise a different polymer. Even with at least some continuous fibre reinforcement extending between the hub portion and the flange portion, the hub portion and the flange portion may each be over-moulded with a different polymer. However it is preferable that the hub portion and the flange portion comprise the same polymer, for example a common polymer matrix that extends from the hub portion to the flange portion. As is described in more detail below, in one or more examples the connector is formed by moulding over a continuous fibre pre-form net that comprises both a hub-forming portion and a flange-forming portion. For example, an injection moulding or resin transfer moulding process may be used to mould the same polymer over a continuous fibre pre-form net that forms the continuous fibre reinforcement of the hub and flange portions.

In some examples, the polymer is preferably a thermosetting polymer, such as a polyester, epoxy or phenolic resin. Thermosetting polymers provide high strength, are easy to work with and can be less expensive than thermoplastic polymers.

Alternatively, in some other examples, the polymer is a thermoplastic polymer, e.g. polyether ether ketone (PEEK), polyetherketoneketone (PEKK), polyetherketone (PEK) or another polymer that is part of the polyaryletherketone (PAEK) family.

The polymer may optionally include one or more non-fibre material additives. For example, the polymer may include small quantities of one or more non-fibre material additives intended to alter one or more non-structural properties of the polymer, such as viscosity, thermal or electrical conductivity, radiation sensitivity, colour, fire or chemical resistance etc.

For example, in aircraft fuel systems, it is important to control the conductivity of the composite connector. Ideally the fuel system (i.e. comprising pipes are connectors) is insulating enough to avoid becoming the preferred path for lighting conduction, whilst conductive enough to avoid static build-up due to fuel flow. Adding a particular amount of a conductive additive (e.g. carbon black) to the polymer during manufacture allows the desired level of conductivity to be achieved. Such an additive is ideally present throughout the component (i.e. in both the flange portion and the hub portion), although this is not essential.

For example, if carbon fibre reinforcement is used in the hub portion but the flange portion contains no carbon fibre reinforcement (e.g. in examples where the flange portion comprises unreinforced polymer), a carbon black additive may only need to be present in the flange portion (as the carbon fibres in the hub portion are already conductive).

To control the conductivity of a fuel system, it may not be necessary to control the conductivity of both the pipe(s) and the connector(s). It may be sufficient, in at least some cases, for the conductivity of only the pipe(s) to be controlled (e.g. by adding a certain concentration of carbon black during pipe manufacture). The connector then simply needs to comprise a minimum level of conductivity for the desired overall conductivity to be achieved. Alternatively, the conductivity of the connector(s) may be controlled and used with a pipe with a simple minimum conductivity.

The angle to the central axis at which the flange portion extends is preferably greater than 45°, and the flange portion is further preferably substantially perpendicular to the central axis of the hub portion, i.e. at about 90°, to enable secure attachment to a surface normal to the central axis. In some examples the entire flange portion may not extend at the same angle to the central axis but may be shaped to accommodate the shape of a particular structure.

"Continuous" fibre reinforcement is used herein to refer to fibre reinforcement in which at least some individual constituent filaments have a substantial length, i.e. they are not short "chopped fibres" or discontinuous fibres. In at least some examples, the fibre reinforcement may be considered to be "continuous" when the fibres or filaments have a length on the same scale as the part they are reinforcing. This means that the fibre reinforcement is substantially "continuous" when it extends uninterrupted across a given dimension of a part, such as a length, radius or circumference.

The use of continuous fibre reinforcement within the hub and flange portions allows the coefficient of thermal expansion of the composite connector to be tuned to a desired value. For example, the coefficient of thermal expansion of the composite connector may be made to substantially match that of a corresponding fluid transfer conduit.

In at least some examples, the hub portion comprises regions consisting of unreinforced polymer, i.e. with no continuous fibre reinforcement. However, in at least some other examples, the hub portion comprises continuous circumferentially-oriented fibre reinforcement. In addition to the strength benefits, utilising continuous circumferentially-oriented fibre reinforcement in the hub portion also enables the coefficient of thermal expansion (i.e. the "hoop" CTE) of the hub portion to be closely matched to that of a fluid transfer conduit to which it may be connected.

Fluid transfer conduits for which the connector of the present disclosure is particularly suitable are composite parts manufactured from fibre-reinforced polymers comprising a high proportion of continuous circumferentially-oriented fibres. This maximises the hoop strength and thus the internal pressure tolerance of the conduit, something which is particularly important in high pressure systems such as fuel pipes, while minimising weight. Because of the high proportion of circumferential fibre in such composite conduits, when the fluid transfer conduit is subject to a change in temperature (e.g. due to changing ambient conditions), the radial expansion is dominated by the expansion of the fibre reinforcement. Fibres used as reinforcement in such materials typically have a very low CTE compared to the polymer matrix. For example, glass fibres have a CTE of around $1.6$-$2.9 \times 10^{-6}$ K-1 and carbon fibres have a CTE which is very close to zero (and may even be negative, e.g. roughly $-0.5 \times 10^{-6}$ K-1), while a typical polymer resin has a CTE of $\sim 50 \times 10^{-6}$ K-1 (for comparison, aluminium has a CTE of $\sim 23 \times 10^{-6}$ K-1). As a result, the circumferential (hoop) thermal expansion of a fibre-reinforced polymer conduit with continuous circumferential fibre is usually low.

Injection-moulded, randomly-oriented chopped fibre-reinforced composites, in comparison, have a hoop CTE which is dominated by the CTE of the resin matrix—i.e. much higher than that of the fibre-reinforced polymer (FRP) conduits described above. Metal connectors also suffer relatively high thermal expansion.

Conventional connectors therefore, when used with fibre-reinforced polymer conduits, can only be used within a small temperature operating envelope. Differential expansion of the connector and the conduit when subject to temperatures outside this envelope can risk the integrity of the seal and/or the entire connection. Or, the requirement to accommodate such temperature variations and differing CTEs puts design constraints on other elements such as the O-ring. A similar issue arises when a connector has a different stiffness to that of a conduit.

However, as mentioned above, because the hub portion in examples of the present disclosure comprises continuous circumferentially-oriented fibre reinforcement, its hoop CTE (and its stiffness) can be more closely matched to that of a given fluid transfer conduit. Matching the CTE allows relative expansion (of the connector relative to the conduit) during use to be minimised over a wider range of temperatures, increasing the applicability and reliability of the part. In some examples, therefore, the composition and orientation of the continuous circumferentially-oriented fibre reinforcement within the hub portion is selected such that the CTE (i.e. the hoop CTE) of the hub portion matches that of a fluid transfer conduit, formed from FRP, which is connected to the hub portion in use. Additionally or alternatively, the composition and orientation of the fibre reinforcement within the hub portion is selected such that the stiffness of the hub portion substantially matches that of the fluid transfer conduit.

The hub portion is preferably arranged to fit onto or into a fluid transfer conduit, e.g. concentric therewith, with a conduit fitting over an outer diameter of the hub portion or inside an inner diameter of the hub portion. The flange portion is preferably arranged to attach to a further structure and may comprise one or more attachment points thereto.

There is further disclosed a connection system comprising a composite connector as disclosed herein and a FRP fluid transfer conduit connected to the hub portion. In one or more examples, the composition and orientation of the continuous fibre reinforcement at least within the hub portion is selected such that the coefficient of thermal expansion of the hub portion substantially matches that of the fluid transfer conduit. Additionally or alternatively, the composition and orientation of the fibre reinforcement within the hub portion is selected such that the stiffness of the hub portion substantially matches that of the fluid transfer conduit.

As mentioned above, an elastomeric O-ring may be used to seal a connection between the connector and a fluid transfer conduit. In such cases the O-ring may be positioned between an outer surface of the fluid transfer conduit and an inner surface of the hub portion (or, conversely, between an inner surface of the conduit and an outer surface of the hub portion), to seal the connection. Optionally, the elastomeric O-ring is seated between a pair of retaining ridges that allow for axial movement between the fluid transfer conduit and the hub portion. The strong and stiff hub portion keeps the O-ring tightly pressed radially between the inner (or outer) surface of the hub portion and the outer (or inner) surface of the fluid transfer conduit, ensuring the integrity of the seal.

In one or more examples, matching of the coefficient of thermal expansion and/or stiffness may be achieved by matching the composition and angle of the continuous circumferentially-oriented fibre reinforcement within the hub portion to the composition and angle of continuous circumferentially-oriented reinforcing fibre within the FRP conduit. The continuous circumferentially-oriented fibre reinforcement in the hub portion may therefore have substantially the same fibre angle as the continuous circumferentially-oriented fibre reinforcement in the conduit. In some examples these fibre angles may differ by no more than 15°, no more than 10°, and, preferably, by no more than 5°.

In the hub portion, the continuous circumferentially-oriented (hoop) fibre reinforcement typically makes an angle of more than 60° to the central axis. In preferred examples the continuous circumferentially-oriented fibre reinforcement extends at an angle of more than 80° to the central axis, e.g. at least 85°, or even at or close to 90°. A high angle maximises the hoop strength provided by the continuous circumferentially-oriented fibre reinforcement.

In some examples the hub portion comprises a mixture of layers of continuous axially-oriented and/or helically-oriented fibre reinforcement and layers of the continuous circumferentially-oriented fibre reinforcement, e.g. alternating layers of continuous axially-oriented and circumferentially-oriented fibre reinforcement. This provides the hub portion with uniform strength and mitigates delamination during use. Mixing layers of continuous fibre reinforcement with different orientations may also prevent large residual stresses being produced during manufacture, which can severely weaken the connector.

The hub portion preferably comprises a tube with a substantially circular cross-section (i.e. the hub portion comprises a cylinder). A circular cross-section maximises the hoop strength of the hub portion and can be easier to manufacture. In some examples, however, the tube may have a rectangular, other polygonal or an elliptical cross-section, amongst other possible shapes. Preferably the hub portion has a cross-section which matches that of a fluid transfer conduit to which it is suitable for connecting. In a connection system as disclosed above, the hub portion may have substantially the same cross-section as the fluid transfer conduit.

The present disclosure extends to a method of manufacturing a composite (e.g. fibre-reinforced polymer) connector for a fluid transfer conduit, the method comprising: manufacturing a continuous fibre pre-form net that is shaped to comprise a hub-forming portion and a flange-forming portion, the continuous fibre pre-form net comprising continuous fibre reinforcement and a common support layer to which the continuous fibre reinforcement is secured by being stitched thereto, wherein at least some of the continuous fibre reinforcement extends between the hub-forming portion and the flange-forming portion; placing the continuous fibre pre-form net into a mould, the mould being shaped such that the hub-forming portion forms a tubular hub portion which extends along a central axis and the flange-forming portion forms a flange portion which extends from the hub portion at an angle to the central axis; and introducing polymer into the mould so as to form a composite connector comprising the flange portion and the hub portion.

Securing the continuous fibre reinforcement to a support layer holds the continuous fibre reinforcement together in the pre-form net and in a desired position/orientation when the pre-form net is placed into the mould. This allows a connector with the desired properties (e.g. fibre densities and/or orientations) to be manufactured more easily and reliably. The use of stitching in the pre-form net can allow precise fibre reinforcement placement, making it possible to achieve complicated shapes with precise fibre orientation. In one or more examples, manufacturing the continuous fibre pre-form net may comprise a tailored fibre placement technique.

It will be appreciated that the continuous fibre pre-form net may be a substantially two-dimensional e.g. planar structure that is shaped to comprise a hub-forming portion and a flange-forming portion. The mould may have a three-dimensional shape that is chosen to correspond with the shape of the continuous fibre pre-form net, such that the hub-forming portion is converted into the three-dimensional shape of the tubular hub portion and the flange-forming portion is converted into the three-dimensional shape of the flange portion. There may be a number of different shapes for the continuous fibre pre-form net that result in substantially the same or similar shapes for the hub portion and flange portion. Placing the continuous fibre pre-form net into the mould may comprise conforming the continuous fibre pre-form net to the mould, for example through bending and/or manipulating the continuous fibre pre-form net. The flange-forming portion and/or the hub-forming portion may comprise a series of interconnected segments which are arranged to facilitate conforming the pre-form net to the mould.

In one set of examples, the flange-forming portion may comprise an annular portion which surrounds the hub-forming portion. In such examples the hub-forming portion may comprise one or more tabs which extend from an inner edge of the annular portion. The continuous fibre pre-form net may have an overall disc-like shape. In such examples, placing the pre-form net into the mould comprises folding out the one or more tabs such that they extend at an angle to the annular flange-forming portion. The mould may be shaped, for example by comprising a cylindrical surface oriented along the central axis, such that the tabs extend along the central axis to form at least part of the tubular hub portion. As is described further below, a hub-forming overwrap may also be placed in the mould around the central axis.

Alternatively, the hub-forming portion may comprise a contiguous sheet (not comprising separate segments or tabs—e.g. a rectangular sheet) and the flange-forming portion may comprise one or more tabs extending from an edge of the contiguous sheet. In such examples, placing the continuous fibre pre-form net into the mould comprises wrapping the hub-forming portion into a tubular shape around the central axis to form a hub portion, and folding the one or more tabs of the flange-forming portion outwards such that they extend at an angle to the central axis to form a flange portion.

In at least some such examples, the hub-forming portion preferably comprises continuous fibre reinforcement which is arranged to form continuous circumferentially-oriented fibre reinforcement in the hub portion. Preferably, manufacturing the continuous fibre pre-form net further comprises arranging the continuous fibre reinforcement in the hub-forming portion of the continuous fibre pre-form net to form continuous circumferentially-oriented fibre reinforcement in the hub portion. The continuous circumferentially-oriented fibre reinforcement preferably comprises at least some individual constituent filaments which extend around a significant fraction of the circumference of the hub portion, e.g. extending 90°, 180°, 270° or more around the central axis of the hub portion.

Continuous circumferentially-oriented fibre reinforcement in the hub portion provides increased circumferential (hoop) strength, improving the connector's resistance to high hoop loads (e.g. due to high pressure fluid within a fluid transfer conduit positioned within the hub portion). Continuous circumferentially-oriented fibre reinforcement in the hub portion thus enables further weight savings, by enabling a part with a required strength to be produced with less material.

In addition to weight savings, the use of continuous circumferentially-oriented fibre reinforcement within the hub portion of the connector also confers other benefits. For example, the continuous circumferentially-oriented fibre reinforcement may stiffen the hub portion. When fluid at high pressure is passed through a fluid transfer conduit connected to the connector, this increased stiffness mitigates radial expansion of the connector, ensuring that a good connection and seal with the fluid transfer conduit is maintained at all times.

In addition, or alternatively, manufacturing the continuous fibre pre-form net may comprise arranging the continuous fibre reinforcement in the hub-forming portion of the continuous fibre pre-form net to form continuous axially-oriented and/or helically-oriented fibre reinforcement in the hub portion.

As mentioned above, placing the continuous fibre pre-form net into a mould may comprise conforming the continuous fibre pre-form net to the mould, e.g. by bending, folding or otherwise manipulating the continuous fibre pre-form net into a three-dimensional shape of the mould. However, due to the limitations inherent in forming a three-dimensional structure from a net, when the continuous fibre pre-form net is placed into the mould, the mould may comprise one or more regions into which the continuous fibre pre-form net does not extend, but to which the polymer nevertheless permeates when it is introduced. This leaves the resulting composite connector with regions of unreinforced polymer between segments of continuous fibre reinforcement.

For instance, in examples where the flange-forming portion comprises an annular portion and the hub-forming portion comprises one or more tabs that extend inwards from an inner edge of the annular portion, gaps between the one or more tabs may appear when they are folded to form a connector with a flange portion that extends from the hub portion at an angle to the central axis (i.e. unreinforced regions may appear in the hub portion such that the resulting connector does not comprise a tubular hub portion with contiguous continuous fibre reinforcement).

While, at least in some examples, regions of unreinforced polymer in the composite connector may be acceptable (e.g. in applications with low load requirements, or if the regions of unreinforced polymer are coincident with regions requiring a low load capacity), it may be beneficial to reduce the size or prevalence of, or to entirely eliminate, such regions. In some examples, therefore, the continuous fibre pre-form net comprises one or more overlapping tabs. Such overlapping tabs allow a planar net to be formed into a three dimensional connector with fewer or smaller regions of unreinforced polymer. For example, the hub-forming portion of such a continuous fibre pre-form net may comprise two or more tabs which overlap. Preferably, when the continuous fibre pre-form net is placed into the mould, the overlapping tabs are spread such that they no longer overlap substantially.

Manufacturing the pre-form net may comprise manufacturing the common support layer prior to any stitching. The common support layer may comprise a single piece of support material (e.g. stamped out of a larger sheet), but in some examples the common support layer may be formed by joining together several separate pieces of support material (e.g. a fibre veil). This may facilitate the forming of overlapping tabs in the pre-form net in some examples. The pieces may be joined via stitching, preferably using a non load-bearing thread such as a polyester embroidery thread.

Alternatively, or additionally, the method may comprise manufacturing a plurality of continuous fibre pre-form nets. Each of the plurality of continuous fibre pre-form nets may comprise a hub-forming portion and a flange-forming portion. In some such examples, the method may comprise placing the plurality of continuous fibre pre-form nets into the mould so as to minimise or eliminate regions of the mould into which at least one continuous fibre pre-form net does not extend. This may, for example, be achieved by positioning one continuous fibre pre-form net over another and/or offsetting (e.g. angularly offsetting) the plurality of continuous fibre pre-form nets within the mould, to mitigate gaps in continuous fibre pre-form coverage within the mould.

The plurality of continuous fibre pre-form nets may comprise a first continuous fibre pre-form net and a second continuous fibre pre-form net. The first continuous fibre pre-form net may comprise a hub-forming portion and a flange-forming portion, wherein the flange-forming portion comprises an annular portion which surrounds the hub-forming portion and the hub-forming portion comprises one or more tabs which extend from an inner edge of the annular portion. The second continuous fibre pre-form net may comprise a hub-forming overwrap (e.g. a rectangular sheet). In such examples, placing the plurality of continuous fibre pre-form nets into the mould comprises folding out the one or more tabs of the first continuous fibre pre-form net such that they extend at an angle to the flange-forming portion and wrapping the hub-forming overwrap around the hub-forming portion of the first continuous fibre pre-form net such that the finished connector comprises continuous circumferentially-oriented fibre reinforcement in the hub portion, provided by the hub-forming overwrap.

For example, the method may comprise manufacturing two continuous fibre pre-form nets, each comprising a flange-forming portion comprising an annular portion and a hub-forming portion comprising one or more tabs extending from an inner edge of the annular portion. The two continuous fibre pre-form nets may be placed into the mould with the annular portions aligned, but with an angular offset, such that gaps in the hub-forming portions of one continuous fibre pre-form net are at least partially covered by the tabs of the other continuous fibre pre-form net. This reduces, and may eliminate, regions of unreinforced polymer in the hub portion of the finished connector.

The continuous fibre reinforcement that extends between the hub-forming portion and the flange-forming portion may be arranged to facilitate the flange-forming portion being bent or folded relative to the hub-forming portion (e.g. to conform to the shape of the mould). This may comprise slack being built into the continuous fibre reinforcement stitched to the continuous fibre pre-form net at or near a boundary between the hub-forming and flange-forming portions. This slack enables the flange-forming and hub-forming portions to be easily manipulated into a desired position relative to one another to form the flange and hub portions when the continuous fibre pre-form net is placed into the mould.

By moulding polymer around the continuous fibre pre-form net, the flange portion and the hub portion may be integrated by the moulding process. As is mentioned above, preferably the same polymer is moulded around the continuous fibre pre-form net. This manufacturing method therefore avoids a polymer joint between two composite parts or pre-impregnated fibre forms that are subsequently overmoulded or co-moulded to form the hub and flange portions of the composite connector.

In one or more examples, manufacturing the continuous fibre pre-form net may comprise arranging the continuous fibre reinforcement in multiple orientations, for example in circumferential and/or radial and/or axial orientations. Such fibre placement can be exploited to optimise the fibre orientations in the resulting hub and flange portions. For example, the continuous fibre reinforcement in the hub-forming portion may be arranged in the continuous fibre pre-form net to provide some substantially axially-orientated fibres in the hub portion that could not be provided by other manufacturing techniques such as filament winding.

In one or more examples, manufacturing the continuous fibre pre-form net may further comprise stitching multiple layers to the common support layer. As is mentioned above, the overall thickness of the composite connector may be dictated by the number of layers used and the thickness of those layers.

In one or more examples, manufacturing the continuous fibre pre-form net may comprise forming at least one fixing point for the flange portion by arranging the continuous fibre reinforcement in the flange-forming portion in a pattern around the fixing point, e.g. such that the continuous fibre reinforcement strengthens the fixing point. In at least some examples, preferably the continuous fibre reinforcement is arranged to at least partially encircle the fixing point(s)

In one or more examples, introducing polymer into the mould may comprise a resin transfer moulding (RTM) process or vacuum infusion process, wherein preferably the polymer comprises a thermosetting polymer. In some examples, the method may further comprise curing the composite connector in the mould. In some examples, the method may comprise heating the mould to pre-cure the composite connector and/or a post-moulding curing step may be used after removing the connector from the mould.

However, as RTM or vacuum infusion processes can require relatively long cure times, in some other examples, introducing polymer into the mould comprises an injection moulding process, wherein preferably the polymer comprises a thermoplastic polymer. Injection moulding typically has a much shorter cure time, although the material costs may be greater.

In various examples according to the present disclosure, the continuous fibre reinforcement may comprise any suitable fibre material. For example, the continuous fibre reinforcement may consist of one or more of glass, carbon or synthetic (e.g. aramid) fibres. Glass fibre reinforcement may be preferred for connectors intended to be used with fluid transfer conduits (e.g. fuel pipes) made of glass fibre-reinforced composite.

The present disclosure refers throughout to a composite connector comprising a hub portion and a flange portion. It will be appreciated that a given connector may comprise more than one flange portion per hub portion, or more than one hub portion per flange portion. Any single-ended, double-ended or multiple port connector is included within this disclosure.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

Certain examples of the present disclosure will now be described with reference to the accompanying drawings in which:

FIG. 1 is a cross sectional view of the connection between a connector and a fluid transfer conduit;

FIG. 4 shows a composite connector for a fluid transfer conduit according to another example of the present disclosure;

FIG. 5 shows a continuous fibre pre-form net used to manufacture the composite connector of FIG. 4;

FIG. 6 shows another example of a composite connector;

FIGS. 7 and 8 show a corresponding pre-form net used to manufacture the composite connector of FIG. 6;

FIG. 9 shows another example of a composite connector;

FIG. 10 shows a corresponding pre-form net used to manufacture the composite connector of FIG. 9;

FIG. 11 shows a cross sectional view of examples of composite connectors formed from the pre-form net of FIG. 10;

FIG. 12 shows a cross sectional view of examples of composite connectors formed from the pre-form net of FIG. 10;

FIG. 13 shows a further example of a pre-form net used to manufacture the composite connector of FIG. 9;

DETAILED DESCRIPTION

Figure 3:
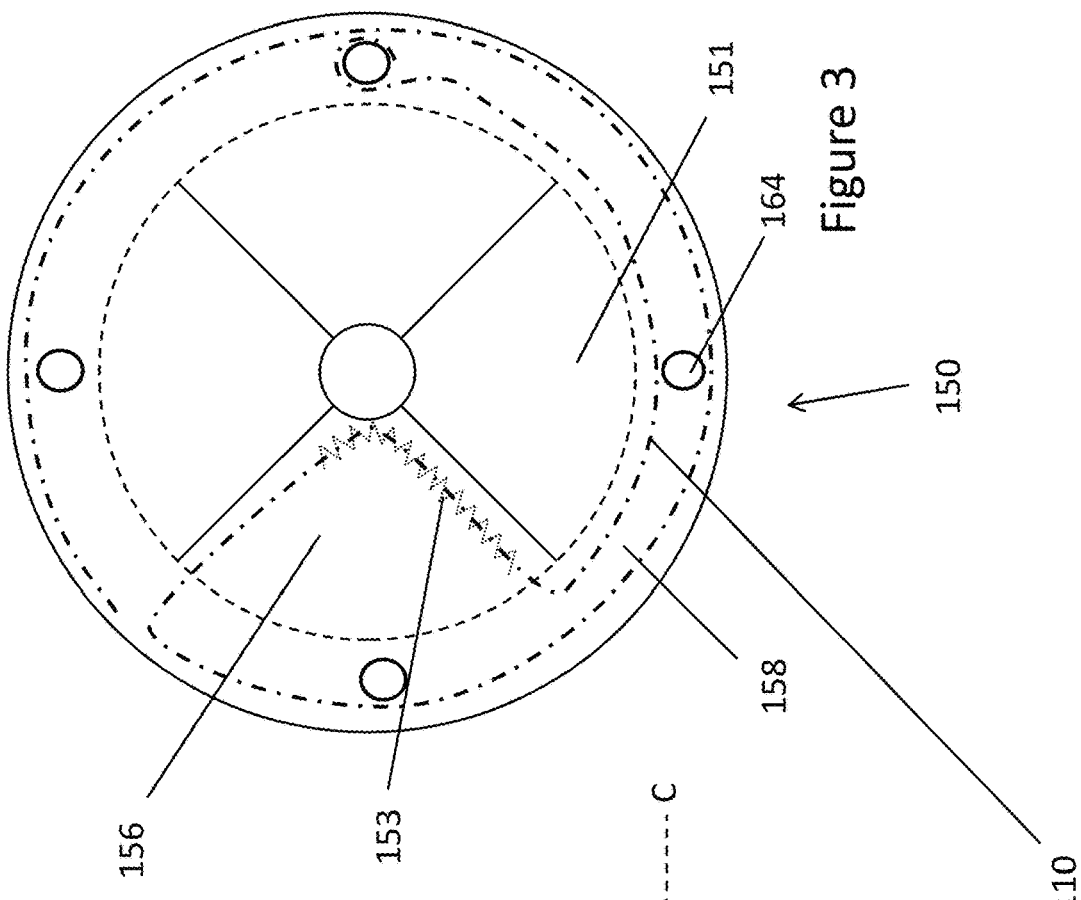
FIG. 3 shows a plan view of a continuous fibre pre-form net used to manufacture the composite connector of FIG. 2.

FIG. 1 shows the interface between a connector 2 and a cylindrical fluid transfer conduit 4 that extends parallel to a central axis C. The connector 2 comprises a cylindrical hub portion 6, which also extends parallel to the central axis C, and a flange portion 8, which extends from an end of the hub portion 6 in a direction perpendicular to the central axis C. The flange portion 8 further comprises a through-hole 10, by which the connector 2 may be secured to another structure, e.g. an aircraft wing rib.

The hub portion 6 encloses a connection portion 12 of the fluid transfer conduit 4. An elastomeric O-ring 14 is located between the hub portion 6 and the connection portion 12, retained between an inner wall of the hub portion 6 and an outer wall of the fluid transfer conduit 4. The O-ring 14 is confined by two retaining ridges 16 which extend radially outwards from the connection portion 10 of the fluid transfer conduit 4.

The O-ring 14 provides a seal between the connector 2 and the conduit 4, such that fluid may flow along the conduit 4 and into the connector 2 without escaping. In addition, the configuration of O-ring 14 between the two retaining ridges 16 of the connection portion 12 and the hub portion 6 allows the fluid transfer conduit 4 to move a small distance in the direction of the central axis C relative to the connector 2 without compromising the seal. This enables a structure to which the connector 2 is secured to move or flex a small amount without imparting large stresses on the conduit 4 (as would be the case if the connector 2 was rigidly attached to the conduit 4). Instead, the conduit 4 "floats" on the O-ring 14 such that it can slide longitudinally a small distance without breaking the seal. For example, the structure to which the connector 2 is attached may be an aircraft wing rib, which is designed to move a small amount during flight as the wing flexes due to aerodynamic load and/or temperature fluctuations. The fluid transfer conduit 4 may comprise a fuel pipe located within the wing which must therefore be able to cope with the wing flex during flight.

Figure 2:
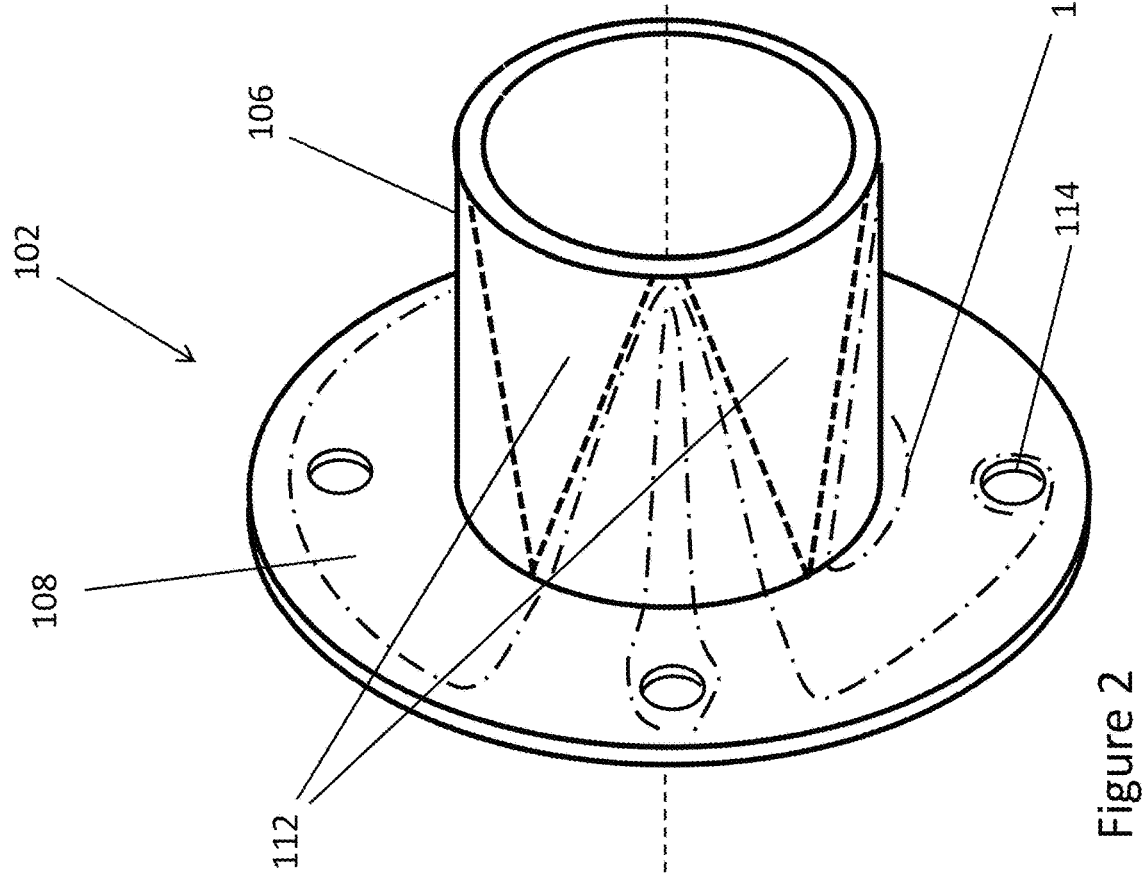
FIG. 2 shows a schematic perspective view of a composite connector for a fluid transfer conduit according to an example of the present disclosure.

FIG. 2 is a schematic perspective view of a composite connector 102 according to an example of the present disclosure. The connector 102 comprises a cylindrical hub portion 106 which extends parallel to a central axis C and a flange portion 108 which extends perpendicularly from an end of the hub portion 106.

Continuous fibre reinforcement 110 extends between the hub portion 106 and the flange portion 108. This strengthens the transition between the hub portion 106 and the flange portion 108 and thus increases the ability of the connector 102 to withstand bending loads (e.g. due to wing flex or inertial loads during flight). The flange portion 108 comprises four through holes 114 (although only three are visible in FIG. 2), around which the continuous fibre reinforcement 110 diverts. The fibre reinforcement 110 may encircle entirely the through holes 114, possibly several times.

Figure 21:
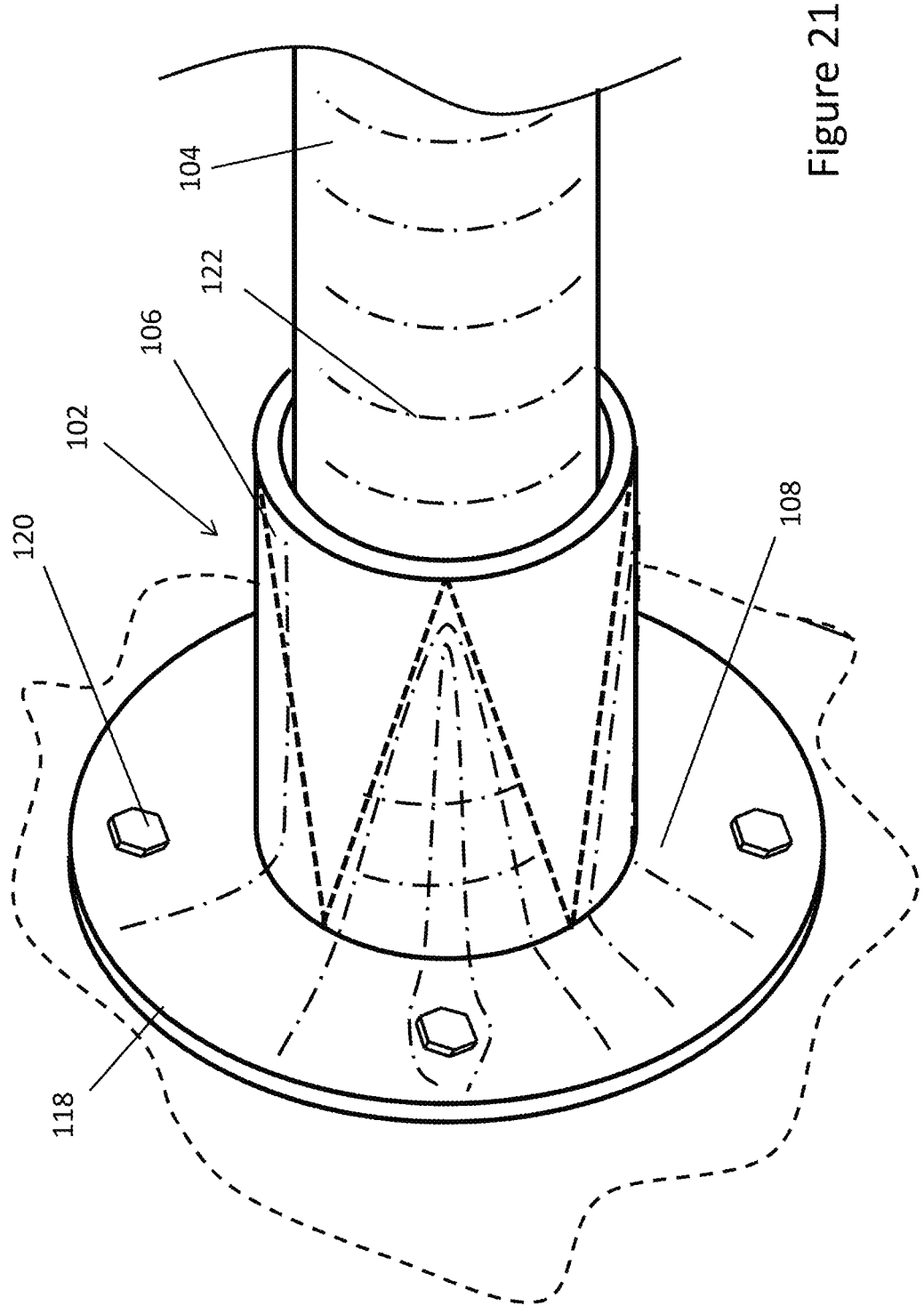
FIG. 21 shows a connection system according to an example of the present disclosure.

A connection system comprising the connector 102 of FIG. 2 and a fibre-reinforced polymer fluid transfer conduit is shown in FIG. 21.

FIG. 3 shows an example of a continuous fibre pre-form net 150 used to form the composite connector 102. The net 150 comprises an annular flange-forming portion 158 which surrounds a hub-forming portion 156. The hub-forming portion 156 is split into four separate segments or tabs which extend radially inward from an inner edge of the flange-forming portion 158. The continuous fibre pre-form net 150 comprises a planar common support layer 151, to which the continuous fibre reinforcement 110 is secured via stitching 153 (only a small section of stitching is shown to aid clarity). Securing the continuous fibre reinforcement 110 to the common support layer 151 by stitching 153 means it can be positioned in any direction or orientation and held in place. In this example, the stitching 153 comprises a polyester thread, although other materials may be used (e.g. nylon). The continuous fibre reinforcement 110 extends circumferentially in the flange-forming section 158 and extends into each of the segments of the hub-forming section 156 (the continuous fibre reinforcement 110 is only shown partially in FIGS. 2 and 3 for clarity).

The pre-form net 150 comprises four through holes 164, defined by holes in the common support layer 151 and reinforced by being encircled by the continuous fibre reinforcement 110. These will become the through holes 114 in the finished connector 102.

As explained below in further detail, the composite connector 102 is formed by placing the pre-form net 150 into a mould, with each of the segments of the hub-forming portion 156 bent up to be perpendicular to the annular flange-forming portion 158. A polymer matrix is then introduced into the mould to form the composite connector 102.

Figure 15:
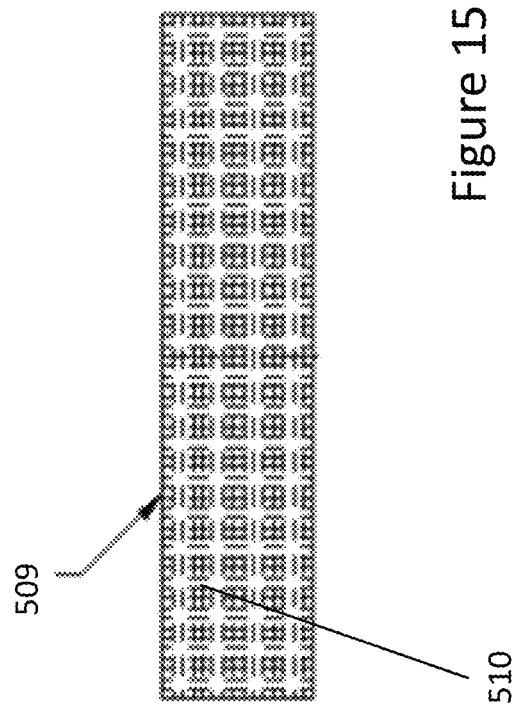
FIG. 15 shows an example of a hub overwrap pre-form net used to manufacture the composite connector of FIG. 14.

As seen in FIG. 2, bending the segments of the hub-forming portion 156 to be perpendicular to the annular flange-forming portion 158 results in unreinforced joins and/or gaps 112 comprising non-reinforced polymer appearing in the hub portion 106 of the composite connector 102. These unreinforced joins and/or gaps 112 correspond to regions of the mould to which the pre-form net 150 does not extend but to which the polymer introduced into the mould has permeated regardless. As will be explained in more detail below, the strength in these unreinforced regions can be improved, if desired, by the addition of a separate preform layer (such as that shown in FIG. 15), e.g. which can be formed into a cylinder for use in the hub portion 106 only and eliminates any regions without fibre reinforcement.

FIG. 4 shows a schematic perspective view of a composite connector 202 according to another example of the present disclosure. The connector 202 comprises a cylindrical hub portion 206 which extends parallel to a central axis C and a flange portion 208 which extends perpendicularly from an end of the hub portion 206. Continuous fibre reinforcement 210 extends between the hub portion 206 and the flange portion 208.

FIG. 5 shows a pre-form net 250 used to form the composite connector 202. The net 250 comprises a rectangular hub-forming portion 256, from one edge of which a flange-forming portion 258 extends. The flange-forming portion 258 comprises a plurality of tabs. The continuous fibre reinforcement 210 extends from the hub-forming portion 256 into each of the tabs of the flange-forming portion 258. The continuous fibre pre-form net 250 comprises a planar common support layer 251, to which the continuous fibre reinforcement 210 is secured via stitching 253 (only a small section of stitching is shown in FIG. 5 to aid clarity).

The composite connector 202 is formed by placing the pre-form net 250 into a mould, with the hub-forming portion 256 rolled into a tubular shape and the tabs of the flange-forming portion 258 bent outwards such that they extend perpendicularly from the hub-forming portion 256. The tabs will go on to form the annular flange portion 208 of the finished connector. A polymer matrix is then introduced into the mould to form the composite connector 202.

As seen in FIG. 4, bending the tabs of the flange-forming portion 258 outwards results in the annular flange portion 208 comprising a plurality of unreinforced gaps 212 made up of non-reinforced polymer. These unreinforced gaps 212 correspond to regions of the mould to which the pre-form net 250 does not extend but to which the polymer introduced to the mould has nevertheless permeated.

As mentioned above, the connectors 102, 202 comprise unreinforced gaps 112, 212 (in the hub portion 106 and the flange portion 208 respectively) where no continuous fibre reinforcement 110, 210 is present (i.e. comprising non-reinforced polymer). It may be desirable to reduce the size of or entirely eliminate these unreinforced regions wherever possible. FIG. 6 shows a composite connector 302 in which these gaps have been reduced. FIG. 7 shows a pre-form net 350 used to form the connector 302.

The composite connector 302 comprises a cylindrical hub portion 306 which extends parallel to a central axis C and a flange portion 308 which extends perpendicularly from an end of the hub portion 306. Continuous fibre reinforcement 310 extends between the hub portion 306 and the flange portion 308.

The pre-form net 350 comprises an annular flange-forming portion 358 which surrounds a hub-forming portion 356. Somewhat similarly to the pre-form net 150 shown in FIG. 3, the hub-forming portion 356 comprises a plurality of separate segments or tabs which extend radially inwards from an inner edge of the flange-forming portion 358 (only four tabs are shown in FIG. 7 to aid clarity).

However, in contrast to the net 150 shown in FIG. 3, the tabs of the hub-forming portion 356 overlap in this example. The pre-form net 350 comprises a common support layer 351 to which the continuous fibre reinforcement 310 is secured by stitching (not shown in FIG. 7). The continuous fibre reinforcement 310 extends circumferentially in the flange-forming section 358 and extends into each tab of the hub-forming section 356 (although the continuous fibre reinforcement 310 is only shown partially in FIGS. 6 and 7 for clarity).

To enable the tabs of the hub-forming portion 356 to overlap, the common support layer 351 comprises a multi-piece support layer formed by joining together several separate pieces (not shown) of a support material (e.g. a fibre veil). The pieces are joined by stitching using a non load-bearing thread such as a polyester embroidery thread.

As mentioned above, the tabs of the hub-forming portion 356 overlap. During manufacture, each tab is lifted in turn to allow fibre reinforcement 310 to be stitched to the tab(s) underneath. This ensures that the fibre reinforcement 310 extends into each tab.

FIG. 8 shows an example of the placement and orientation of the continuous fibre reinforcement 310 in the pre form net 350. FIG. 8 shows a portion of the continuous fibre reinforcement 310a extending along and across a tab of the hub-forming portion 356, a portion of the continuous fibre reinforcement 310b running circumferentially and radially in the flange-forming portion 358, and a portion of the continuous fibre reinforcement 310c encircling a through-hole 312 in the flange-forming portion 358.

As can be seen in FIG. 6, the overlapping tabs in the hub-forming portion 356 of the pre-form net 350 mean that the resulting composite connector 302 does not feature unreinforced gaps comprising non-reinforced polymer.

FIG. 9 shows a composite connector 402 comprising a cylindrical hub portion 406 which extends parallel to a central axis C and a flange portion 408 which extends perpendicularly from an end of the hub portion 406. Continuous fibre reinforcement 410 extends between the hub portion 406 and the flange portion 408.

A pre form net 450 used to form the composite connector 402 is shown in FIG. 10. The pre-form net 450 comprises an elongate rectangular hub-forming portion 456, from one edge of which a flange-forming portion 458 extends. The flange-forming portion 458 comprises a plurality of trapezoidal tabs. The continuous fibre reinforcement 410 extends from the hub-forming proton 456 into each of the tabs of the flange-forming portion 458. The continuous fibre pre-form net 450 comprises a planar common support layer 451, to which the continuous fibre reinforcement 410 is secured via stitching (not shown).

The composite connector 402 is formed by placing the pre-form net 450 into a mould, with the hub-forming portion 456 rolled into a tubular shape to form the hub portion 406 and the tabs of the flange-forming portion 458 bent outwards such that they extend perpendicularly from the hub-forming portion 456 to form the flange portion 408. As shown in cross section in FIG. 11, the pre-form net 450 is wound around the central axis several times (e.g. two), such that the hub portion 406 of the composite connector comprises several layers of the hub-forming portion 456 (i.e. several layers of the support 451 and the fibre reinforcement 410 which is stitched thereto). Alternatively, as shown in FIG. 12, two pre-form nets 450a,b may be placed in the mould with an angular offset.

The flange portion 408 of the composite connector thus comprises several (e.g. two) layers 408a, 408b of the flange-forming portion 458. The tabs in subsequent layers 408a, 408b of the flange portion 408 are offset such that gaps in one layer (e.g. 408a) are covered by the tabs of another (e.g. 408b), as shown in FIG. 9. As such, the flange portion 408 of the finished connector 402 does not comprise regions of non-reinforced polymer.

An alternative example of a pre-form net 480 which may be used to form the composite connector 402 is shown in FIG. 13. The pre-form net 480 comprises a rectangular hub-forming portion 486, from one edge of which a flange-forming portion 488 extends. The flange-forming portion 488 comprises a plurality of triangular tabs. Continuous fibre reinforcement 410 extends from the hub-forming portion 486 into each of the tabs of the flange-forming portion 488. The continuous fibre pre-form net 480 comprises a common support layer 481, to which the continuous fibre reinforcement 410 is secured via stitching (not shown). The tabs of the flange-forming portion 488 are overlapping, such that when the pre-form net 480 is formed into the composite connector 402 no gaps comprising non-reinforced polymer appear in the flange portion 408.

Figure 14:
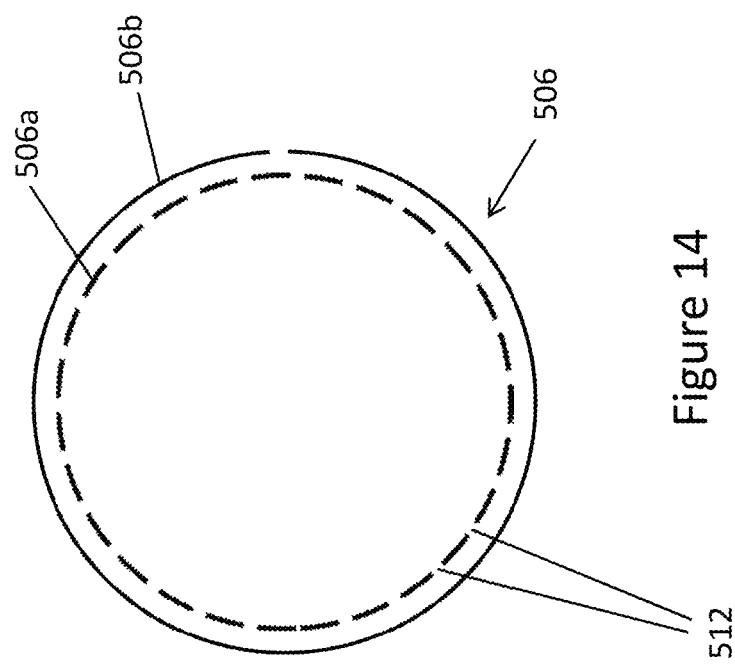
FIG. 14 is a cross sectional view of another example of a composite connector.

FIG. 14 shows a cross sectional view of a hub portion 506 of a composite connector according to another example of the present disclosure. The hub portion 506 is made from a pre-form net comprising a plurality of tabs, similarly to the composite connector 102 shown in FIG. 2, such that the hub portion 506 comprises an inner layer 506a featuring a plurality of joins and/or gaps 512 between the tabs. However, the hub portion 506 in this example further comprises an additional outer layer 506b, which comprises a rectangular support layer 509 (shown in FIG. 15) to which continuous fibre reinforcement 510 has been stitched, which is wrapped around the inner layer 506a. This reinforces the joins and/or covers the gaps 512 in the inner layer 506a, so that the hub portion 506 comprises no entirely non-reinforced regions of polymer.

The overwrapped outer layer 506b confers additional advantages to the hub portion 506. The fibre reinforcement 510 in the outer layer 506b extends continuously around substantially the entire circumference of the hub portion 506. This continuous circumferentially-oriented fibre reinforcement 510 may improve the hoop strength of the hub portion 506, as well as enabling better CTE and/or stiffness matching when the connector is used with a composite fluid transfer conduit comprising similarly circumferentially-oriented fibre reinforcement (not shown).

Figure 16:
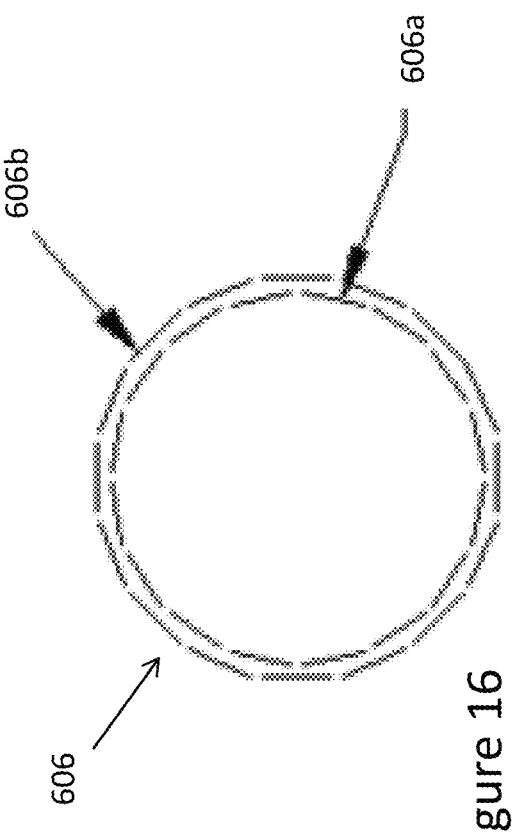
FIG. 16 is a cross sectional view of another example of a composite connector.

Alternatively, as shown in FIG. 16, a hub portion 606 of a composite connector may comprise inner and outer layers 606a, 606b which each comprise tabbed pre-form nets similar to that seen in FIG. 3 or 6. The inner and outer layers 606a, 606b are angularly offset, such that joins or gaps in one layer are covered by the tabs of the other.

Figure 17:
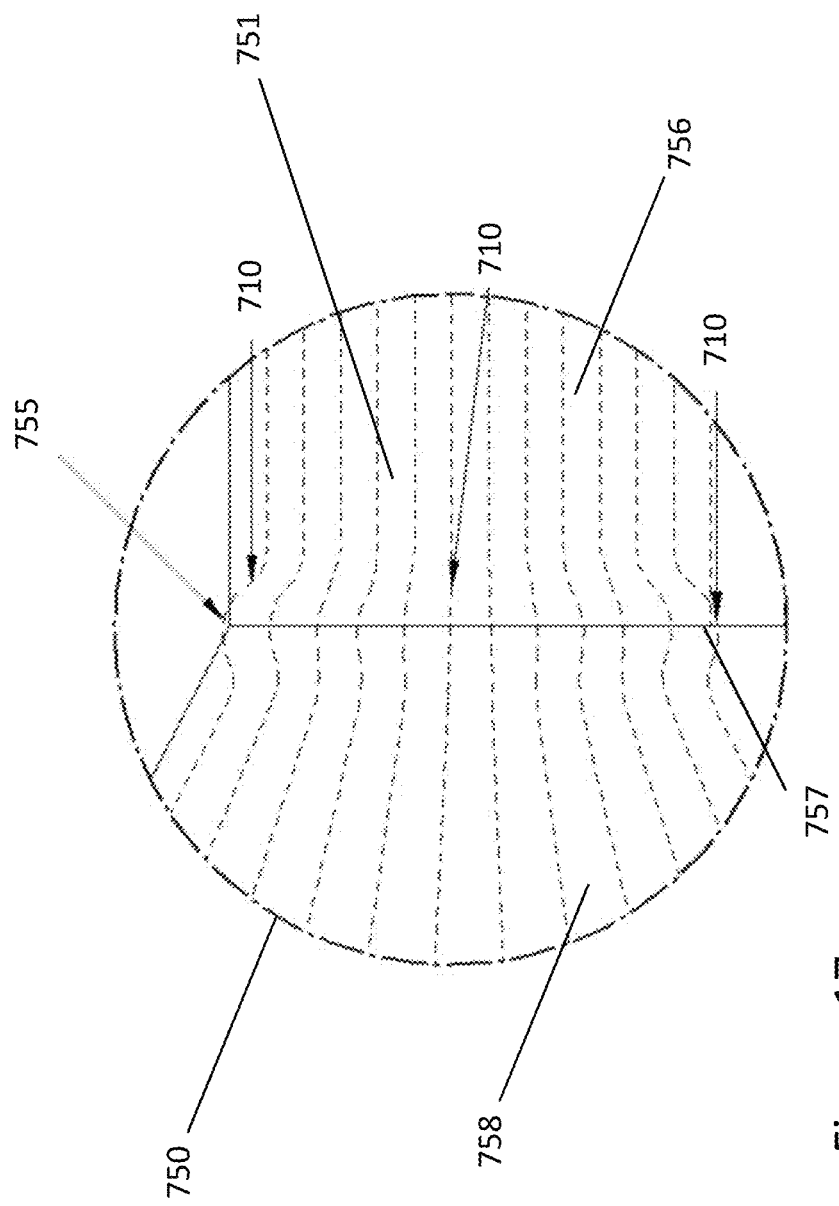
FIG. 17 is an enlarged view of continuous fibre reinforcement in a pre-form net according to one or more of the examples disclosed herein.

FIG. 17 shows an enlarged view of continuous fibre reinforcement 710 in a pre-form net 750. The pre-form net 750 is similar in structure to that shown in FIG. 10 and comprises a common support layer 751 to which the continuous fibre reinforcement 710 is secured by being stitched thereto (although the stitching is not illustrated). FIG. 17 shows an enlarged view of the boundary 757 between a hub-forming portion 756 and a flange-forming portion 758 of the pre-form net 750.

As seen in FIG. 17, slack 755 may be built into the continuous fibre reinforcement 710 at points near the boundary 757. The slack 755 facilities bending the flange-forming portion 758 relative to the hub forming portion 756 when the pre-form net 750 is placed into a mould (not shown). The amount of slack required may be proportional in magnitude to the distance of each section of continuous fibre reinforcement 710 from the centreline (not shown) of the flange-forming portion 758.

Figure 18:
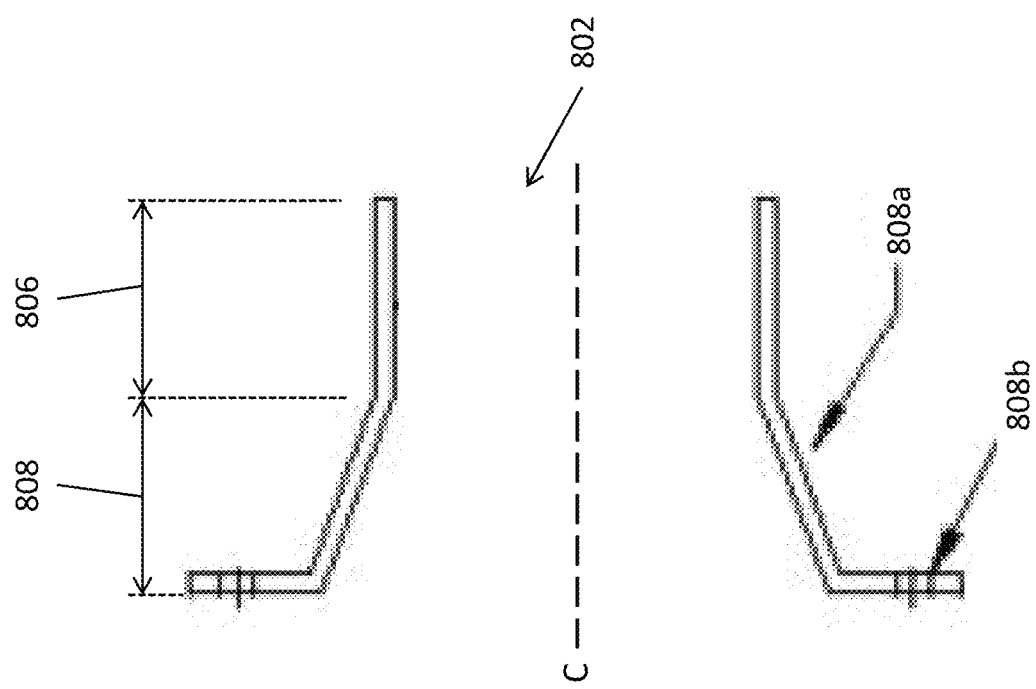
FIG. 18 is a cross sectional view of another example of a composite connector.

FIG. 18 shows, in cross-section, a three-stage tapered connector 802 comprising a hub portion 806 which extends parallel to a central axis C and a flange portion 808. The flange portion 808 comprises a tapering portion 808a and a non-tapering portion 808b. Continuous fibre reinforcement 810 (shown in FIG. 19) extends from the hub portion 806, through the tapering portion 808a and into the non-tapering portion 808b of the flange portion 808.

Figure 19:
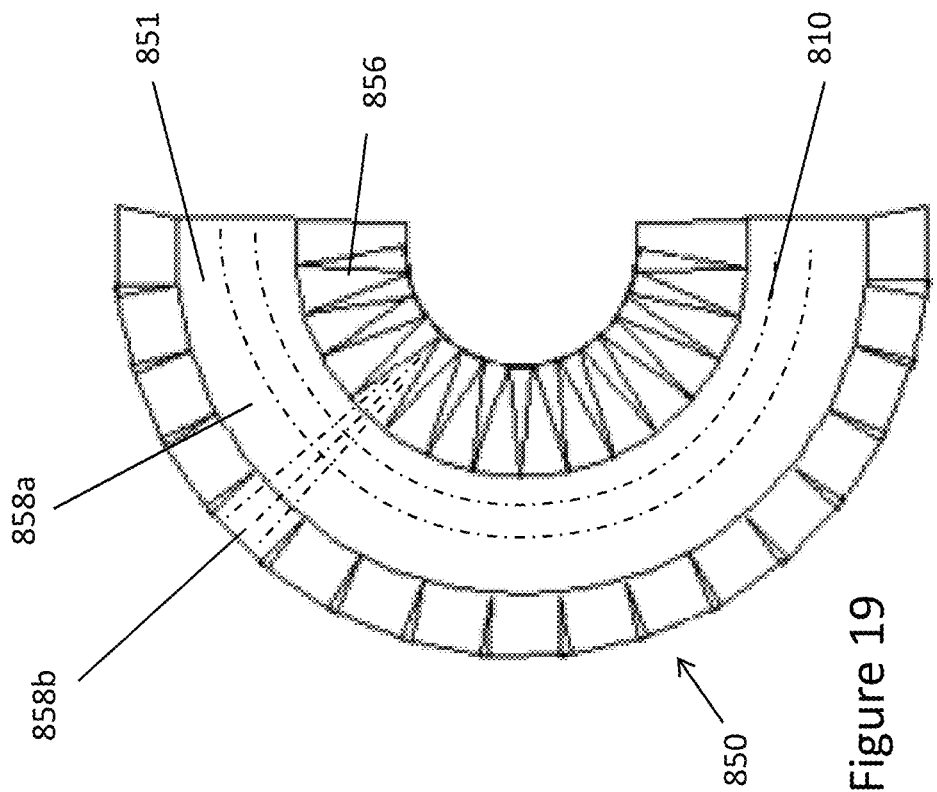
FIG. 19 shows a further example of a pre-form net used to manufacture the composite connector of FIG. 18.

A pre-form net 850 which may be used to form the tapered connector 802 is shown in FIG. 19. The pre-form net 850 comprises flange-forming portions 858a, 858b and a hub-forming portion 856. The flange-forming portions comprise a contiguous portion 858a and a tabbed portion 858b which extends from an edge of the contiguous portion 858a. The hub-forming portion 856 comprises a plurality of tabs which extend from an opposite edge of the contiguous portion 858a.

The continuous fibre reinforcement 810 extends from the tabs of the hub-forming portion 856 into the contiguous and tabbed flange-forming portions 858a, 858b. The continuous fibre pre-form net 850 comprises a planar common support layer 851, to which the continuous fibre reinforcement 810 is secured via stitching (not shown).

The composite connector 802 is formed by placing the pre-form net 850 into a mould, with the contiguous portion 858a rolled into a frustoconical shape around the central axis C to form the tapering portion 808a of the flange portion 808. The tabs of the hub-forming portion 856 are bent outwards to form the tubular hub portion 806 and the tabs of the tabbed portion 858b are bent to be perpendicular to the hub-portion 806 to form the non-tapering flange portion 808b. A polymer matrix is then introduced into the mould to form the composite connector 802.

Figure 20:
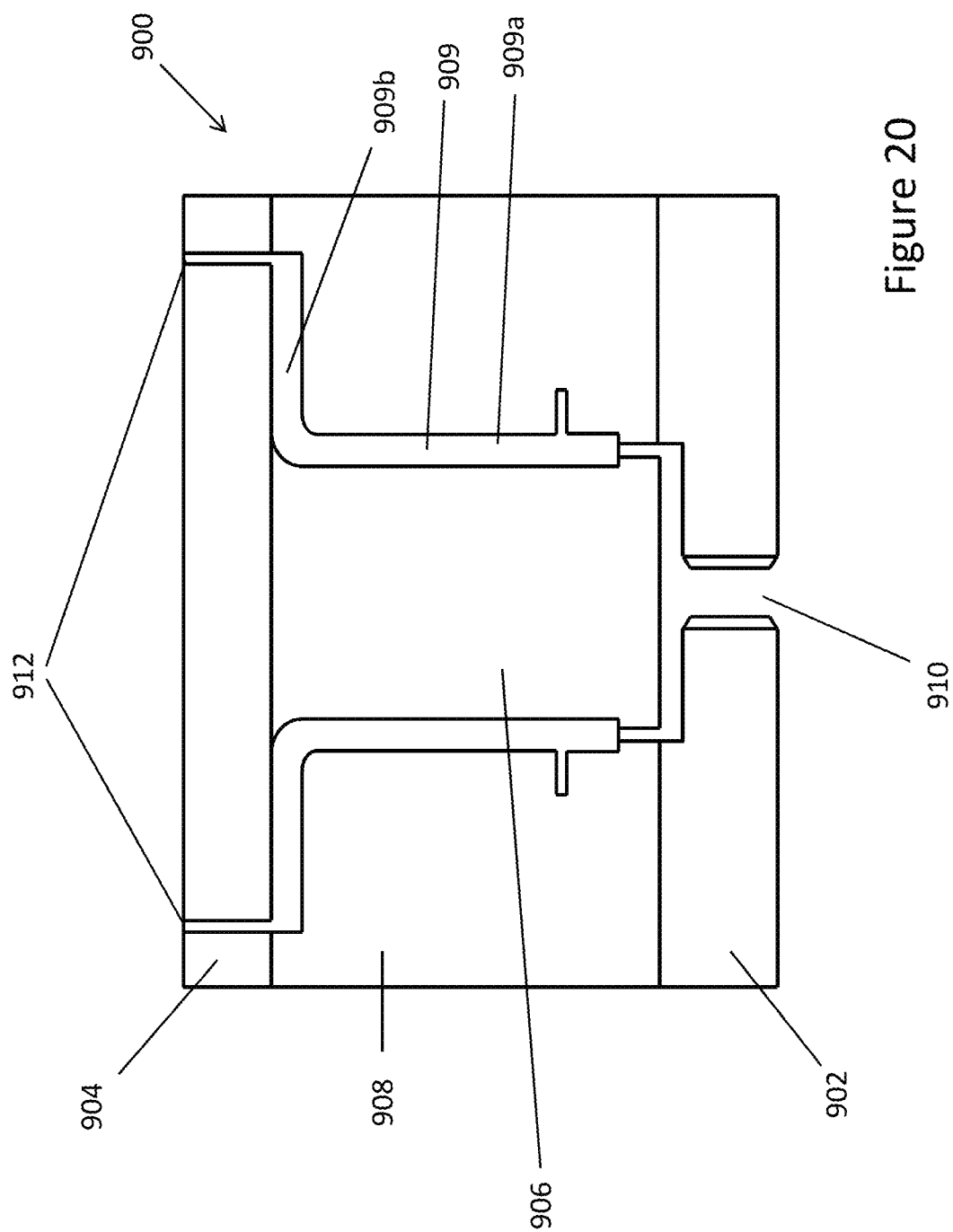
FIG. 20 is a cross sectional view of a mould used to manufacture a composite connector.

FIG. 20 shows an example of a mould 900 which may be used (e.g. as described above) to form a composite connector according to one or more examples of the present disclosure.

The mould 900 comprises a base plate 902, a top plate 904 and inner and outer portions 906, 908. The inner and outer portions 906, 908 together define a cavity 909 which comprises a tubular hub-forming cavity 909a interconnected with an annular flange-forming cavity 909b.

The base plate 902 comprises a polymer injection port 910 into which liquid polymer may be injected into the cavity 909. The top plate 904 comprises two outlets 912 which are connected to the cavity 909.

To form a composite connector, a continuous fibre pre-form net (e.g. one of the pre-form nets shown in FIG. 3, 5, 7, 10, 13 or 19) is placed into the mould 900 such that a hub-forming portion of said net is placed in the hub-forming cavity 909a and a flange-forming portion of said net is placed in the flange-forming cavity 909b.

Liquid polymer (e.g. a thermosetting polymer) is then introduced under pressure into the mould 900 via the polymer injection port 910. The pressure under which the polymer is introduced and, optionally, a vacuum which may be applied at the outlets 912, draws the polymer through the cavity 909 and around and into the pre-form net. Once the polymer has filled the cavity 909 and fully permeated the continuous fibre reinforcement of the pre-form net, heat is applied to the mould 900 to cure the thermosetting polymer and form the completed composite connector. In examples wherein a thermoplastic polymer is injected into the mould 900 then curing may not be necessary.

The completed connector may then be removed from the mould 909 (e.g. by removing the bottom plate 902 and the outer portion 908).

FIG. 21 shows a perspective view of the composite connector 102 in use, connecting one end of a composite fuel pipe 104, comprising continuous circumferentially-oriented fibre reinforcement 122, to a wing rib 118 of an aircraft. The composite fuel pipe 104 extends into the hub portion 106 and floats inside on an O-ring (not shown), which also serves to seal the connection. The connector 102 is secured rigidly to the spar 118 via four bolts 120 (only three are visible in this Figure).

During flight, due to aerodynamic forces and/or temperature-based expansion/contraction, the wing rib 118 (and thus the connector 102) may move relative to the fuel pipe 104. However, because the composite fuel pipe 104 floats on an O-ring, it is able to move relative to the connector 102 without compromising the connection.

The invention claimed is:

1. A composite connector for a fluid transfer conduit comprising:
    a hub portion comprising a tube which extends substantially parallel to a central axis; and
    a flange portion which extends from the hub portion at an angle to the central axis;
    wherein the hub portion and the flange portion comprise a polymer reinforced with continuous fibre reinforcement;
    wherein at least some of the continuous fibre reinforcement extending between the hub portion and the flange portion;
    wherein the composite connector comprises a plurality of common support layers to which the continuous fibre reinforcement of the hub portion and the flange portion is secured by being stitched thereto; and
    wherein the flange portion comprises continuous circumferentially-oriented fibre reinforcement and the continuous fibre reinforcement in the hub portion comprises separate segments of continuous fibre reinforcement.

2. The composite connector of claim 1, wherein the continuous fibre reinforcement comprises multiple layers stitched to the plurality of common support layers.

3. The composite connector of claim 1, wherein the hub portion comprises continuous circumferentially-oriented fibre reinforcement.

4. The composite connector of claim 1, wherein the flange portion comprises at least one fixing point and the continuous fibre reinforcement is arranged to at least partially encircle the fixing point(s).

5. The composite connector of claim 1, wherein the flange portion is substantially perpendicular to the central axis of the hub portion.

6. A connection system comprising:
    the composite connector of claim 1; and
    a fibre-reinforced polymer fluid transfer conduit connected to the hub portion.

7. The connection system as claimed in claim 6, wherein the composition and orientation of the continuous fibre reinforcement at least within the hub portion is selected such that the coefficient of thermal expansion or stiffness of the hub portion substantially matches that of the fluid transfer conduit.

8. A composite connector for a fluid transfer conduit comprising:
    a hub portion comprising a tube which extends substantially parallel to a central axis; and
    a flange portion which extends from the hub portion at an angle to the central axis;
    wherein the hub portion and the flange portion comprise a polymer reinforced with continuous fibre reinforcement, the continuous fibre reinforcement extending between the hub portion and the flange portion;
    wherein the composite connector comprises a common support layer to which the continuous fibre reinforcement of the hub portion and the flange portion is secured by being stitched thereto; and
    wherein the hub portion comprises continuous circumferentially oriented fibre reinforcement, and the flange portion comprises separate segments of continuous fibre reinforcement.

9. A connection system comprising:
    the composite connector of claim 8; and
    a fibre-reinforced polymer fluid transfer conduit connected to the hub portion.

10. A composite connector for a fluid transfer conduit comprising:
    a hub portion comprising a tube which extends substantially parallel to a central axis; and
    a flange portion which extends from the hub portion at an angle to the central axis;
    wherein the hub portion and the flange portion comprise a polymer reinforced with continuous fibre reinforcement; wherein at least some of the continuous fibre reinforcement extending between the hub portion and the flange portion; and
    wherein the composite connector comprises a plurality of common support layers to which the continuous fibre reinforcement of the hub portion and the flange portion is secured by being stitched thereto.

* * * * *